US012597676B2

(12) United States Patent
Chen et al.

(10) Patent No.: US 12,597,676 B2
(45) Date of Patent: Apr. 7, 2026

(54) BATTERY CELL, METHOD AND SYSTEM FOR MANUFACTURING BATTERY CELL, BATTERY, AND ELECTRICAL DEVICE

(71) Applicant: CONTEMPORARY AMPEREX TECHNOLOGY (HONG KONG) LIMITED, Hong Kong (CN)

(72) Inventors: Xiaobo Chen, Ningde (CN); Yao Li, Ningde (CN); Mingguang Gu, Ningde (CN); Qiu Jin, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 441 days.

(21) Appl. No.: 17/947,054

(22) Filed: Sep. 16, 2022

(65) Prior Publication Data

US 2023/0018297 A1     Jan. 19, 2023

Related U.S. Application Data

(63) Continuation of application No. PCT/CN2021/097225, filed on May 31, 2021.

(51) Int. Cl.
| | |
|---|---|
| *H01M 50/342* | (2021.01) |
| *H01M 50/103* | (2021.01) |
| *H01M 50/14* | (2021.01) |
| *H01M 50/15* | (2021.01) |
| | (Continued) |

(52) U.S. Cl.
CPC ..... *H01M 50/3425* (2021.01); *H01M 50/103* (2021.01); *H01M 50/14* (2021.01);
(Continued)

(58) Field of Classification Search
CPC .......... H01M 50/3425; H01M 50/586; H01M 50/474; H01M 50/103; H01M 50/55;
(Continued)

(56) References Cited

U.S. PATENT DOCUMENTS

2012/0177983 A1    7/2012  Kim
2016/0197373 A1    7/2016  Shaffer et al.
(Continued)

FOREIGN PATENT DOCUMENTS

CN        107394063 A    11/2017
CN        109565014 A     4/2019
(Continued)

OTHER PUBLICATIONS

CN209056523U Machine Translation (Year: 2019).*
(Continued)

*Primary Examiner* — Brian R Ohara
*Assistant Examiner* — Emily Elizabeth Freeman
(74) *Attorney, Agent, or Firm* — Ladas & Parry LLP

(57) ABSTRACT

This application provides a battery cell, a method and system for manufacturing same, a battery, and an electrical device. The battery cell includes: an electrode assembly; a shell assembly, configured to accommodate the electrode assembly and including a first side plate and a second side plate, where the first side plate and the second side plate are located on two sides of the electrode assembly along a first direction respectively; a pressure relief mechanism, disposed on the first side plate; and a support member, disposed between the electrode assembly and the first side plate, and configured to support the electrode assembly. A duct is provided on the support member. The duct is configured to guide gas between the second side plate and the support member into the pressure relief mechanism, so that the pressure relief mechanism is actuated to release a pressure when the pressure reaches a threshold.

16 Claims, 8 Drawing Sheets

(51) Int. Cl.

| | | |
|---|---|---|
| *H01M 50/474* | (2021.01) | |
| *H01M 50/477* | (2021.01) | |
| *H01M 50/55* | (2021.01) | |
| *H01M 50/586* | (2021.01) | |
| *H01M 50/593* | (2021.01) | |

(52) U.S. Cl.
      CPC ......... *H01M 50/15* (2021.01); *H01M 50/474*
            (2021.01); *H01M 50/477* (2021.01); *H01M*
            *50/55* (2021.01); *H01M 50/586* (2021.01);
            *H01M 50/593* (2021.01); *H01M 2200/20*
            (2013.01); *H01M 2220/20* (2013.01)

(58) Field of Classification Search
      CPC .. H01M 50/477; H01M 50/15; H01M 50/593;
            H01M 50/14; H01M 2200/20; H01M
            2220/20
      See application file for complete search history.

(56)                  References Cited

U.S. PATENT DOCUMENTS

| | | | |
|---|---|---|---|
| 2017/0331090 A1 | 11/2017 | Li et al. | |
| 2020/0203678 A1* | 6/2020 | Shinoda .............. | H01M 50/209 |
| 2021/0305655 A1* | 9/2021 | Jang ................... | H01M 50/342 |

FOREIGN PATENT DOCUMENTS

| | | | |
|---|---|---|---|
| CN | 209056523 | U | 7/2019 |
| CN | 212323145 | U | 1/2021 |
| CN | 212323146 | U | 1/2021 |
| CN | 112713345 | A | 4/2021 |
| CN | 212991189 | U | 4/2021 |
| CN | 212991190 | U | 4/2021 |
| CN | 213026308 | U | 4/2021 |
| CN | 213026309 | U | 4/2021 |
| CN | 213026310 | U | 4/2021 |
| EP | 3503250 | A1 | 6/2019 |
| KR | 20150061996 | A | 6/2015 |
| WO | 2021023060 | A1 | 2/2021 |
| WO | 2022170553 | A1 | 8/2022 |

OTHER PUBLICATIONS

Extended European Search Report for EP Application No. 21920147. 2, mailed May 17, 2023.

First Office Action of CN application No. 202180054571.1, dated Apr. 16, 2024.

International Search Report for International Application No. PCT/ CN2021/097225, mailed Feb. 25, 2002.

* cited by examiner

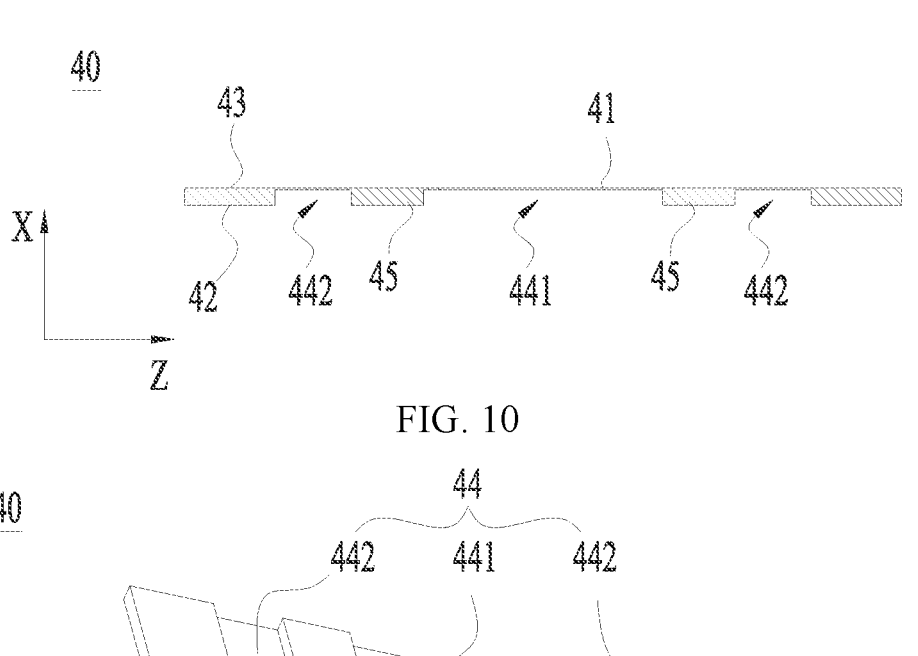
FIG. 10
FIG. 11
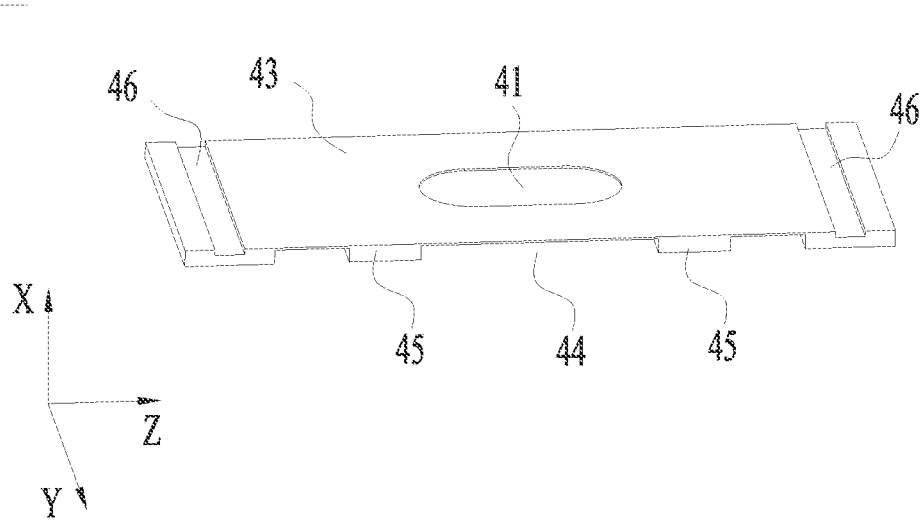
FIG. 12

BATTERY CELL, METHOD AND SYSTEM FOR MANUFACTURING BATTERY CELL, BATTERY, AND ELECTRICAL DEVICE

CROSS REFERENCE TO RELATED APPLICATION

This application is a continuation of International Patent Application No. PCT/CN2021/097225, filed on May 31, 2021, which is incorporated herein by reference in its entirety.

TECHNICAL FIELD

This application relates to the technical field of batteries, and more specifically, to a battery cell, a method and system for manufacturing same, a battery, and an electrical device.

BACKGROUND

Battery cells are widely used in electronic devices such as a mobile phone, a notebook computer, an electric power cart, an electric vehicle, an electric airplane, an electric ship, an electric toy car, an electric toy ship, an electric toy airplane, and a power tool. The battery cells may include a nickel-cadmium battery cell, a nickel-hydrogen battery cell, a lithium-ion battery cell, a secondary alkaline zinc-manganese battery cell, and the like.

In the development of battery technology, safety is a non-negligible issue in addition to improvement of the performance of the battery cell. If the safety of the battery cell is not guaranteed, the battery cell is not suitable for use. Therefore, how to enhance the safety of the battery cell is an urgent technical issue in the battery technology.

SUMMARY

This application provides a battery cell, a method and system for manufacturing same, a battery, and an electrical device to enhance safety of the battery cell.

According to a first aspect, an embodiment of this application provides a battery cell, including:

an electrode assembly;

a shell assembly, configured to accommodate the electrode assembly and including a first side plate and a second side plate, where the first side plate and the second side plate are located on two sides of the electrode assembly along a first direction respectively;

a pressure relief mechanism, disposed on the first side plate; and a support member, disposed between the electrode assembly and the first side plate, and configured to support the electrode assembly, where a duct is provided on the support member, and the duct is configured to guide gas between the second side plate and the support member into the pressure relief mechanism, so that the pressure relief mechanism is actuated to release a pressure when the pressure reaches a threshold.

A first recess is formed on a side that is of the second side plate and that faces the electrode assembly, and the first recess is configured to accommodate at least a part of the electrode assembly.

In the foregoing solution, by disposing a duct on the support member, this embodiment of this application can guide the gas into the pressure relief mechanism, where the gas is released by the battery cell during thermal runaway. In this way, the pressure relief mechanism is actuated in time to release the gas. On the premise that a volume of the electrode assembly is constant, in this embodiment of this application, a first recess is made on the second side plate to accommodate at least a part of the electrode assembly, thereby increasing the spacing between the electrode assembly and the first side plate in the first direction and vacating more space for the support member. Correspondingly, a duct of a larger size can be made on the support member, so as to increase the gas exhausting rate during thermal runaway of the battery cell on the basis of ensuring a relatively high capacity of the battery cell, and improve safety of the battery cell.

In some embodiments, the duct is formed between the support member and the first side plate. In this embodiment of this application, a first recess is made on the second side plate to accommodate at least a part of the electrode assembly, thereby increasing the spacing between the electrode assembly and the first side plate in the first direction and vacating more space for the support member. The duct is formed between the support member and the first side plate, and the dimension of the duct along the first direction can be increased correspondingly, so as to increase the gas exhausting rate of the duct during thermal runaway of the battery cell, and improve the safety of the battery cell.

In some embodiments, the support member is spaced apart from the first side plate in the first direction to form the duct between the support member and the first side plate. A gap is formed between the surface of the support member and the first side plate, the surface facing the first side plate. In this way, the gas exhausting space between the support member and the first side plate is increased, and the gas exhausting rate of the battery cell during thermal runaway is increased.

In some embodiments, the support member includes a first surface and a second surface disposed opposite to each other. The first surface faces the first side plate and abuts against the first side plate, and the second surface faces the electrode assembly. The support member includes a second recess, and the second recess sinks against the first surface along a direction back from the first side plate. At least a part of the second recess overlaps the pressure relief mechanism in the first direction; and the second recess forms at least a part of the duct.

The second recess can guide the gas into the pressure relief mechanism, thereby facilitating actuation of the pressure relief mechanism and release of the gas. The second recess provides a mounting space for the pressure relief mechanism, thereby reducing risks of the support member squeezing or blocking the pressure relief mechanism. By making the second recess, a weight of the support member can be reduced, and an energy density of the battery cell can be increased.

In some embodiments, the second recess runs through the support member along a second direction, and the second direction is perpendicular to the first direction. The space on both sides of the support member along the second direction can communicate with the second recess, so that the gas inside the battery cell can flow into the second recess more easily.

In some embodiments, in the first direction, a depth of the second recess is less than or equal to a depth of the first recess. In this embodiment of this application, the second recess is enlarged by the space vacated by the first recess. The depth of the second recess is less than or equal to the depth of the first recess, thereby ensuring a relatively high capacity of the battery cell.

In some embodiments, at least one support portion is disposed on a bottom wall of the second recess, and the support portion is configured to abut against the first side plate. The second recess includes a first part and a second part. The first part and the second part are located on two sides of the support portion respectively. The first part covers the pressure relief mechanism in the first direction. The second part is staggered from the pressure relief mechanism in the first direction.

The support portion disposed according to this embodiment of this application can increase the overall strength of the support member, reduce risks of deformation and collapse of the support member, and improve stability.

In some embodiments, the support portion includes a communication structure.

The communication structure is configured to implement mechanical communication between the first part and the second part. The communication structure forms a part of the duct.

The communication structure disposed according to this application enables flow of gas between the first part and the second part, thereby increasing gas exhausting paths, and increasing the gas exhausting rate during thermal runaway of the battery cell.

In some embodiments, the support member further includes a third recess. The third recess sinks against the second surface along a direction back from the electrode assembly. The third recess is configured to guide the gas in the electrode assembly into a space between the second side plate and the support member.

During thermal runaway of the battery cell, high-temperature and high-pressure substances such as gas are ejected from both ends of the electrode assembly along the first direction. The third recess can guide the gas, which is ejected from the electrode assembly, into the space between the second side plate and the support member, so that the blocking of gas by the support member is alleviated, and the gas exhausting rate is increased.

In some embodiments, the third recess runs through the support member along a second direction, and the second direction is perpendicular to the first direction.

The third recess runs through the support member along the second direction. Therefore, the space on both sides of the support member along the second direction can communicate with the third recess, and the gas released by the electrode assembly can more easily flow through the third recess into the spaces located on two sides of the support member along the second direction.

In some embodiments, at least one through-hole is made on the support member, and the at least one through-hole runs through the support member along the first direction to communicate with the duct.

With the through-hole, the space between the second side plate and the support member can communicate with the duct. When the battery cell is thermally runaway, the electrode assembly ejects gas toward the support member. A part of the gas can flow through the through-hole into the duct and act on the pressure relief mechanism, so as to be quickly released after the pressure relief mechanism is actuated.

In some embodiments, the shell assembly further includes two third side plates disposed opposite to each other along a second direction. The third side plates are connected to the first side plate and the second side plate, and the second direction is perpendicular to the first direction. In the second direction, an exhaust gap is provided between at least one of the third side plates and the support member. The exhaust gap communicates with the duct and is configured to guide the gas between the second side plate and the support member into the duct.

With the exhaust gap, the space between the second side plate and the support member can communicate with the duct. When the battery cell is thermally runaway, at least a part of the gas released by the electrode assembly can act on the pressure relief mechanism through the exhaust gap and the duct, so as to be released in time after the pressure relief mechanism is actuated.

In some embodiments, the second side plate includes an end cap and an insulation piece. The insulation piece is located on a side that is of the end cap and that faces the electrode assembly, and the insulation piece forms the first recess on the side that faces the electrode assembly.

In some embodiments, the insulation piece includes a first body and a first bulge. The first body includes a first inner surface and a first outer surface opposite to each other. The first inner surface faces the electrode assembly. The first bulge is disposed protrusively on the first outer surface. The first recess is formed on a side that is of the first bulge and that faces the electrode assembly, and sinks against the first inner surface. A fourth recess is formed on a side that is of the end cap and that faces the electrode assembly. The fourth recess is configured to accommodate the first bulge.

The first bulge can exert a reinforcing effect on the position at which the first recess is disposed. In addition, the first bulge disposed can cause the first recess to sink as far as possible along a direction back from the electrode assembly, so as to increase the depth of the first recess and provide more space for the duct. The first bulge is accommodated in the fourth recess, so as to reduce the internal space occupied by the insulation piece, and further vacate more space for the electrode assembly and the support member, and in turn, increase the gas exhausting rate on the basis of ensuring a relatively high capacity of the battery cell.

In some embodiments, the end cap includes a second body and a second bulge. The second body includes a second inner surface and a second outer surface opposite to each other. The second inner surface faces the first body and fits snugly with the first outer surface. The second bulge is disposed protrusively on the second outer surface. The fourth recess is formed on a side that is of the second bulge and that faces the electrode assembly, and sinks against the second inner surface.

The second bulge exerts a reinforcing effect on a position at which the fourth recess is disposed on the end cap. In addition, the fourth recess can sink as far as possible along the direction back from the electrode assembly, so as to accommodate the first recess.

In some embodiments, the second side plate further includes an electrode terminal mounted on the end cap. The electrode terminal is configured to electrically connect to the electrode assembly. Along a protrusion direction of the second bulge, the second bulge does not protrude beyond the electrode terminal. Therefore, even if the second bulge is disposed on the end cap, a maximum dimension of the battery cell in the first direction will not be increased, thereby ensuring a relatively high energy density of the battery cell.

In some embodiments, the insulation piece further includes a third bulge. The third bulge and the first bulge are located on two sides of the electrode terminal respectively. The third bulge is disposed protrusively on the first outer surface. The end cap further includes a fifth recess. The fifth recess sinks against the second inner surface. The fifth recess is configured to accommodate the third bulge.

The third bulge disposed can increase the overall strength of the insulation piece, and reduce the deformation of the insulation piece during the assembling. The third bulge and the fifth recess can serve a positioning function during the assembling of the insulation piece and the end cap. The third bulge may be in interference fit with the fifth recess, so as to implement fixing between the insulation piece and the end cap.

According to a second aspect, an embodiment of this application provides a battery, including the battery cell according to any embodiment according to the first aspect.

According to a third aspect, an embodiment of this application provides an electrical device, including the battery according to the second aspect. The battery is configured to provide electrical energy.

According to a fourth aspect, an embodiment of this application provides a method for manufacturing a battery cell, including:

providing a housing, where the housing includes an opening and a first side plate, and a pressure relief mechanism is disposed on the first side plate;

providing a support member, where a duct is disposed in the support member;

providing an electrode assembly;

providing a cover assembly, where a first recess is formed on one side of the cover assembly;

connecting the cover assembly to the electrode assembly; and placing the support member and the electrode assembly into the housing, and fitting the cover assembly onto the opening.

The first side plate and the cover assembly are located on two sides of the electrode assembly along a first direction respectively. The support member is disposed between the electrode assembly and the first side plate, and configured to support the electrode assembly. The duct is configured to guide gas between the cover assembly and the support member into the pressure relief mechanism, so that the pressure relief mechanism is actuated to release a pressure when the pressure reaches a threshold. The first recess is formed on a side that is of the cover assembly and that faces the electrode assembly. The first recess accommodates at least a part of the electrode assembly.

According to a fifth aspect, an embodiment of this application provides a system for manufacturing a battery cell, including:

a first providing device, configured to provide a housing, where the housing includes an opening and a first side plate, and a pressure relief mechanism is disposed on the first side plate;

a second providing device, configured to provide a support member, where a duct is disposed in the support member;

a third providing device, configured to provide an electrode assembly;

a fourth providing device, configured to provide a cover assembly, where a first recess is formed on one side of the cover assembly;

a first assembling device, configured to connect the cover assembly to the electrode assembly; and a second assembling device, configured to place the support member and the electrode assembly into the housing, and fit the cover assembly onto the opening.

The first side plate and the cover assembly are located on two sides of the electrode assembly along a first direction respectively. The support member is disposed between the electrode assembly and the first side plate, and configured to support the electrode assembly. The duct is configured to guide gas between the cover assembly and the support member into the pressure relief mechanism, so that the pressure relief mechanism is actuated to release a pressure when the pressure reaches a threshold. The first recess is formed on a side that is of the cover assembly and that faces the electrode assembly. The first recess accommodates at least a part of the electrode assembly.

BRIEF DESCRIPTION OF DRAWINGS

To describe the technical solutions in the embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

FIG. 10 is a schematic sectional view of the support member shown in FIG. 8;

FIG. 11 is a schematic structural diagram of a support member of a battery cell according to other embodiments of this application;

FIG. 12 is a schematic structural diagram of a support member of a battery cell according to still other embodiments of this application;

Figure 1:
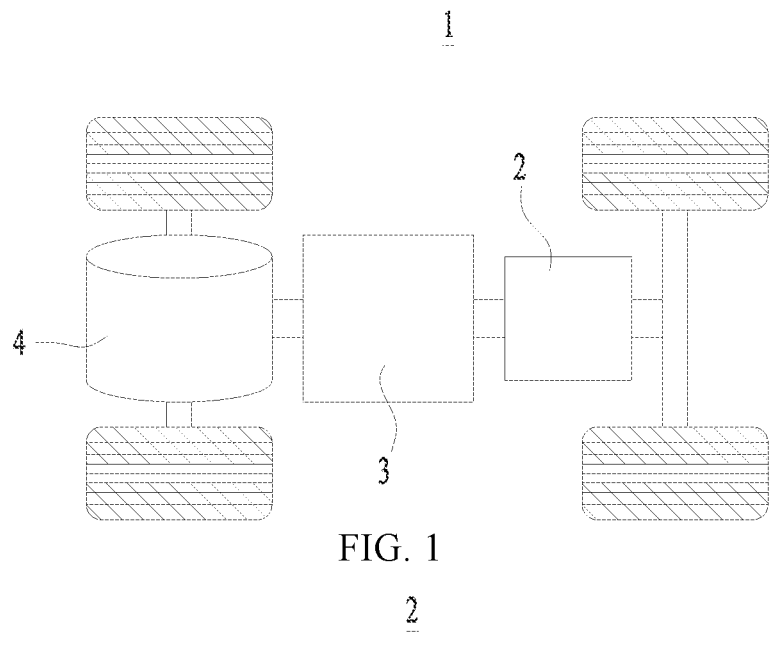
FIG. 1 is a schematic structural diagram of a vehicle according to some embodiments of this application.

The drawings are not drawn to scale.

DETAILED DESCRIPTION

To make the objectives, technical solutions, and advantages of the embodiments of this application clearer, the following gives a clear description of the technical solutions in the embodiments of this application with reference to the drawings in the embodiments of this application. Evidently, the described embodiments are merely a part of but not all of the embodiments of this application. All other embodiments derived by a person of ordinary skill in the art based on the embodiments of this application without making any creative efforts fall within the protection scope of this application.

Unless otherwise defined, all technical and scientific terms used herein have the same meanings as usually understood by a person skilled in the technical field of this application. The terms used in the specification of this application are merely intended for describing specific embodiments but are not intended to limit this application. The terms "include" and "contain" and any variations thereof used in the specification, claims, and brief description of drawings of this application are intended as non-exclusive inclusion. The terms such as "first" and "second" used in the specification, claims, and brief description of drawings herein are intended to distinguish between different items, but are not intended to describe a specific sequence or order of precedence.

Reference to "embodiment" in this application means that a specific feature, structure or characteristic described with reference to the embodiment may be included in at least one embodiment of this application. Reference to this term in different places in the specification does not necessarily represent the same embodiment, nor does it represent an independent or alternative embodiment in a mutually exclusive relationship with other embodiments.

In the description of this application, unless otherwise expressly specified and defined, the terms "mount", "concatenate", "connect", and "attach" are understood in a broad sense. For example, a "connection" may be a fixed connection, a detachable connection, or an integrated connection; or may be a direct connection or an indirect connection implemented through an intermediary; or may be internal communication between two components. A person of ordinary skill in the art understands the specific meanings of the terms in this application according to the context.

The term "and/or" in this application indicates merely a relation for describing the related items, and represents three possible relationships. For example, "A and/or B" may represent the following three circumstances: A alone, both A and B, and B alone. In addition, the character "/" herein generally indicates an "or" relationship between the item preceding the character and the item following the character.

In embodiments of this application, the same reference numeral denotes the same component. For brevity, detailed descriptions of the same component are omitted in a different embodiment. Understandably, dimensions such as thickness, length, and width of various components in the embodiments of this application shown in the drawings, and dimensions such as overall thickness, length, and width of an integrated device are merely exemplary descriptions, but do not constitute any limitation on this application.

"A plurality of" referred to in this application means two or more (including two).

In this application, a battery cell may include a lithium-ion secondary battery cell, a lithium-ion primary battery cell, a lithium-sulfur battery cell, a sodium-lithium-ion battery cell, a sodium-ion battery cell, a magnesium-ion battery cell, or the like. The embodiments of this application do not limit the type of the battery cell. The battery cell may be in a cylindrical shape, a flat shape, a cuboidal shape, or other shapes. The embodiments of this application do not limit the shape of the battery cell. Depending on the form of packaging, the battery cell is typically classed into three types: cylindrical battery cell, prismatic battery cell, and pouchtype battery cell. The embodiments of this application do not limit the form of the battery cell.

The battery mentioned in the embodiments of this application means a stand-alone physical module that includes one or more battery cells to provide a higher voltage and a higher capacity. For example, the battery mentioned in this application may include a battery module, a battery pack, or the like. A battery typically includes a box configured to package one or more battery cells. The box can prevent liquid or other foreign matters from affecting the charging or discharging of the battery cells.

A battery cell includes an electrode assembly and an electrolyte. The electrode assembly includes a positive electrode plate, a negative electrode plate, and a separator. The battery cell works primarily by relying on movement of metal ions between the positive electrode plate and the negative electrode plate. The positive electrode plate includes a positive current collector and a positive active material layer. The positive active material layer is coated on a surface of the positive current collector. The positive current collector includes a positive current collecting portion and a positive bulge that protrudes from the positive current collecting portion. The positive current collecting portion is coated with a positive active material layer. At least a part of the positive bulge is not coated with the positive active material layer. The positive bulge serves as a positive tab. Using a lithium-ion battery as an example, the positive current collector may be made of aluminum. The positive active material layer includes a positive active material. The positive active material may be lithium cobalt oxide, lithium iron phosphate, ternary lithium, lithium manganese oxide, or the like. The negative electrode plate includes a negative current collector and a negative active material layer. The negative active material layer is coated on a surface of the negative current collector. The negative current collector includes a negative current collecting portion and a negative bulge that protrudes from the negative current collecting portion. The negative current collecting portion is coated with a negative active material layer. At least a part of the negative bulge is not coated with the negative active material layer. The negative bulge serves as a negative tab. The negative current collector may be made of copper. The negative active material layer includes a negative active material. The negative active material may be carbon, silicon, or the like. In order to ensure passage of a large current without fusing off, the positive tab is plural in number, and the plurality of positive tabs are stacked together; the negative tab is plural in number, and the plurality of negative tabs are stacked together. The separator may be made of a material such as polypropylene (PP) or polyethylene (PE). In addition, the electrode assembly may be a jelly-roll structure or a stacked structure, without being limited herein.

The battery cell may further include a shell assembly. The shell assembly includes an accommodation cavity inside. The accommodation cavity is a closed space for accommodating the electrode assembly and the electrolyte.

For a battery cell, main safety hazards come from a charging process and a discharging process. In addition, appropriate ambient temperature design is required. To effectively avoid unnecessary losses, the battery cell is generally protected by at least three protective measures. Specifically, the protective measures at least include a switch element, selecting an appropriate separator material, and a pressure relief mechanism. The switch element is an element that, when a temperature or resistance in the battery cell reaches a given threshold, causes the battery to stop charging or discharging. The separator is configured to separate the positive electrode plate from the negative electrode plate, and, when the temperature rises to a given value, automatically melt micron-scale (or even nanometer-scale) micropores attached to the separator, so as to prevent metal ions from passing through the separator and terminate internal reactions of the battery cell.

The pressure relief mechanism means an element or component that is actuated to relieve an internal pressure when the internal pressure of the battery cell reaches a preset threshold. The threshold may vary depending on design requirements. The threshold may depend on the material of one or more of the positive electrode plate, the negative electrode plate, the electrolytic solution, or the separator in the battery cell. The pressure relief mechanism may be in the form of an explosion-proof valve, a gas valve, a pressure relief valve, a safety valve, or the like, and may specifically adopt a pressure-sensitive element or structure. To be specific, when the internal pressure of the battery cell reaches a preset threshold, the pressure relief mechanism performs an action or a fragile structure disposed in the pressure relief mechanism is ruptured to form an opening or duct for relieving the internal pressure or temperature.

The term "actuated" mentioned in this application means that the pressure relief mechanism performs an action or is activated to a given state so that the internal pressure of the battery cell is relieved. The actions performed by the pressure relief mechanism may include, but are not limited to rupturing, shattering, tearing, or opening at least a part of the pressure relief mechanism, or the like. When the pressure relief mechanism is actuated, high-temperature and high-pressure substances inside the battery cell are expelled as emissions out of the actuated position. In this way, the pressure of the battery cell is relieved under a controllable circumstance to avoid potential severer accidents.

The emissions out of the battery cell mentioned in this application include but are not limited to: electrolytic solution, melted or split positive and negative electrode plates, fragments of the separator, high-temperature and high-pressure gases generated during reactions, flames, and the like.

The pressure relief mechanism on the battery cell exerts an important effect on the safety of the battery cell. For example, in a case of short circuit, overcharge, or the like, thermal runaway may occur inside the battery cell, resulting in a sudden rise in pressure. In this case, the internal pressure may be released outward through the actuation of the pressure relief mechanism to prevent explosion and fire of the battery cell.

The pressure relief mechanism is generally mounted on the shell assembly. The applicant finds that in order to increase the energy density of the battery cell, the space available for gas flow inside the battery cell is limited, resulting in a low gas exhausting rate during thermal runaway. In addition, the pressure relief mechanism is prone to be blocked by components inside the shell assembly, resulting in unsmooth air exhausting and safety hazards.

In view of this, an embodiment of this application provides a technical solution. In the technical solution, the battery cell includes: an electrode assembly; a shell assembly, configured to accommodate the electrode assembly and including a first side plate and a second side plate, where the first side plate and the second side plate are located on two sides of the electrode assembly along a first direction respectively; a pressure relief mechanism, disposed on the first side plate; and a support member, disposed between the electrode assembly and the first side plate, and configured to support the electrode assembly. A duct is provided on the support member. The duct is configured to guide gas between the second side plate and the support member into the pressure relief mechanism, so that the pressure relief mechanism is actuated to release a pressure when the pressure reaches a threshold. A first recess is formed on a side that is of the second side plate and that faces the electrode assembly, and the first recess is configured to accommodate at least a part of the electrode assembly. The battery cell with such a structure guides the high-temperature and high-pressure gas into the pressure relief mechanism during thermal runaway, thereby increasing the gas exhausting rate and improving the safety performance.

The technical solution described in this embodiment of this application is applicable to a battery and an electrical device that uses the battery.

The electrical device may be a vehicle, a mobile phone, a portable device, a notebook computer, a ship, a spacecraft, an electric toy, a power tool, or the like. The vehicle may be an oil-fueled vehicle, a natural gas vehicle, or a new energy vehicle. The new energy vehicle may be a battery electric vehicle, a hybrid electric vehicle, a range-extended electric vehicle, or the like. The spacecraft includes an airplane, a rocket, a space shuttle, a spaceship, and the like. The electric toy includes a fixed or mobile electric toy, such as a game console, an electric car toy, an electric ship toy, an electric airplane toy, and the like. The power tool includes an electrical metal cutting tool, an electrical grinding tool, an electrical assembling tool, and a power tool for use in railways. Examples of the power tool are an electrical drill, an electrical grinder, an electrical wrench, an electrical screwdriver, an electrical hammer, an electrical impact drill, a concrete vibrator, an electrical planer, and the like. Embodiments of this application do not particularly limit the electrical device.

For ease of description in the following embodiments, a vehicle is used as an example of the electrical device.

FIG. 1 is a schematic structural diagram of a vehicle according to some embodiments of this application. As shown in FIG. 1, a battery 2 is disposed inside the vehicle 1. The battery 2 may be disposed at the bottom, front, or rear of the vehicle 1. The battery 2 may be configured to supply power to the vehicle 1. For example, the battery 2 may serve as an operating power supply of the vehicle 1.

The vehicle 1 may further include a controller 3 and a motor 4. The controller 3 is configured to control the battery 2 to supply power to the motor 4, for example, to start or navigate the vehicle 1, or meet the operating power requirements of the vehicle in operation.

In some embodiments of this application, the battery 2 serves not only as an operating power supply of the vehicle 1, but may also serve as a drive power supply of the vehicle 1 to provide driving power for the vehicle 1 in place of or partially in place of oil or natural gas.

Figure 2:
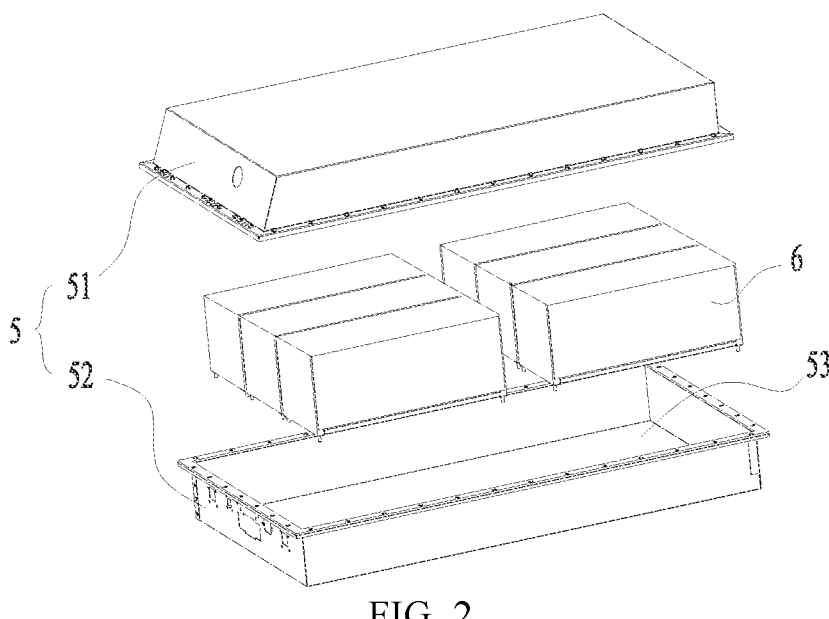
FIG. 2 is a schematic exploded view of a battery according to some embodiments of this application.

FIG. 2 is a schematic exploded view of a battery according to some embodiments of this application. As shown in FIG. 2, the battery 2 includes a box 5 and a battery cell (not shown in FIG. 2). The battery cell is accommodated in the box 5.

The box 5 is configured to accommodate the battery cell. The box 5 may be one of various structures. In some embodiments, the box 5 may include a first box portion 51 and a second box portion 52. The first box portion 51 and the second box portion 52 fit each other. The first box portion 51 and the second box portion 52 together define an accommodation space 53 configured to accommodate the battery cell. The second box portion 52 may be a hollow structure that is opened at one end. The first box portion 51 is a plate-like structure. The first box portion 51 fits on the opening side of the second box portion 52 to form the box 5 provided with the accommodation space 53. The first box portion 51 and the second box portion 52 each may be a hollow structure opened at one side. The opening side of the first box portion 51 fits on the opening side of the second box portion 52, so as to form the box 5 with the accommodation space 53. Definitely, the first box portion 51 and the second box portion 52 may be in various shapes, such as a cylinder or a cuboid.

To improve airtightness between the first box portion 51 and the second box portion 52 that are connected, a sealing element such as a sealant or a sealing ring may be disposed between the first box portion 51 and the second box portion 52.

Assuming that the first box portion 51 fits on the top of the second box portion 52, the first box portion 51 may also be referred to as an upper box, and the second box portion 52 may also be referred to as a lower box.

There may be one or more battery cells in the battery 2. If there are a plurality of battery cells, the plurality of battery cells may be connected in series, parallel, or series-and-parallel pattern. The series-and-parallel pattern means a combination of series connection and parallel connection of the plurality of battery cells. The plurality of battery cells may be directly connected in series, parallel, or series-and-parallel pattern, and then the whole of the plurality of battery cells may be accommodated in the box 5. Alternatively, the plurality of battery cells may be connected in series, parallel, or series-and-parallel pattern to form a battery module 6, and then a plurality of battery modules 6 are connected in series, parallel, or series-and-parallel pattern to form a whole for being accommodated in the box 5.

Figure 3:
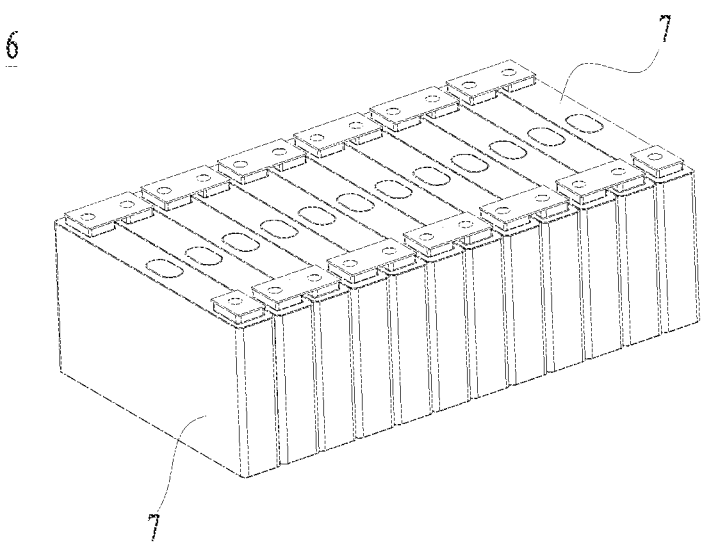
FIG. 3 is a schematic structural diagram of a battery module shown in FIG. 2.

FIG. 3 is a schematic structural diagram of a battery module shown in FIG. 2. As shown in FIG. 3, in some embodiments, there are a plurality of battery cells 7. The plurality of battery cells 7 are connected in series, parallel, or series-and-parallel pattern to form a battery module 6 first. A plurality of battery modules 6 are then connected in series, parallel, or series-and-parallel pattern to form a whole for being accommodated in the box.

The plurality of battery cells 7 in the battery module 6 may be electrically connected by a bus bar component, so as to implement parallel connection, series connection, or series-parallel connection between the plurality of battery cells 7 in the battery module 6.

Figure 4:
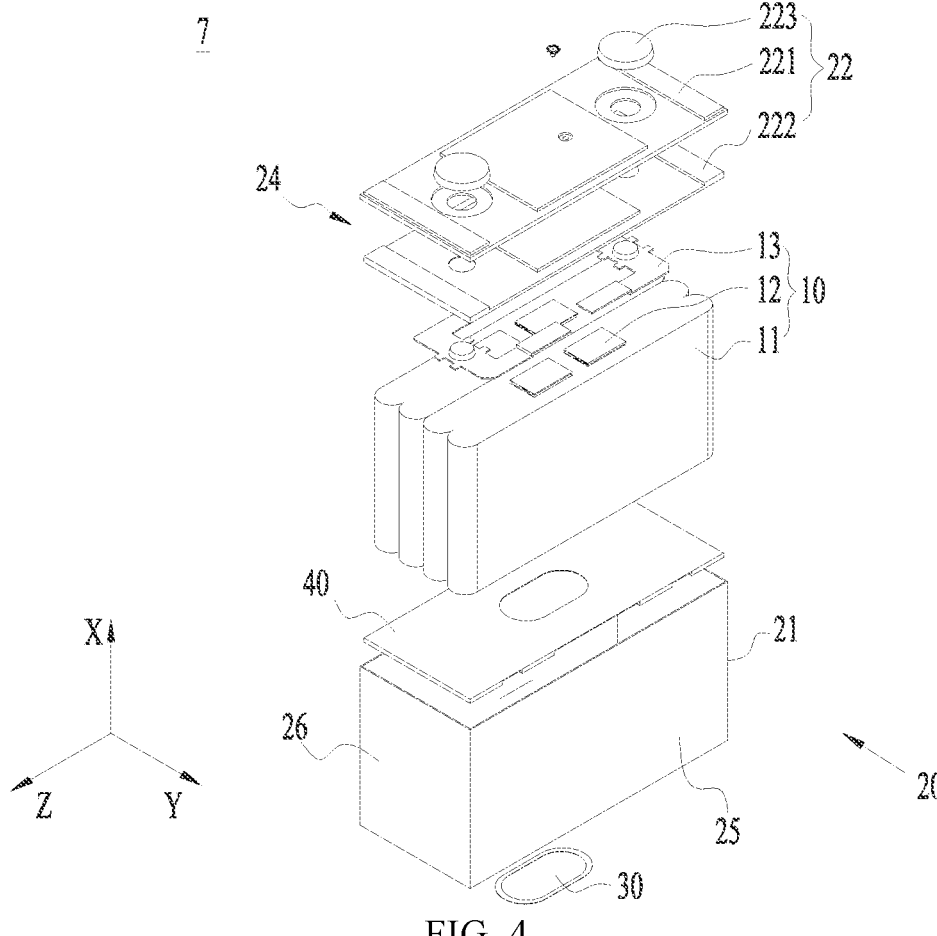
FIG. 4 is a schematic exploded view of a battery cell according to some embodiments of this application.
Figures 5, 6:
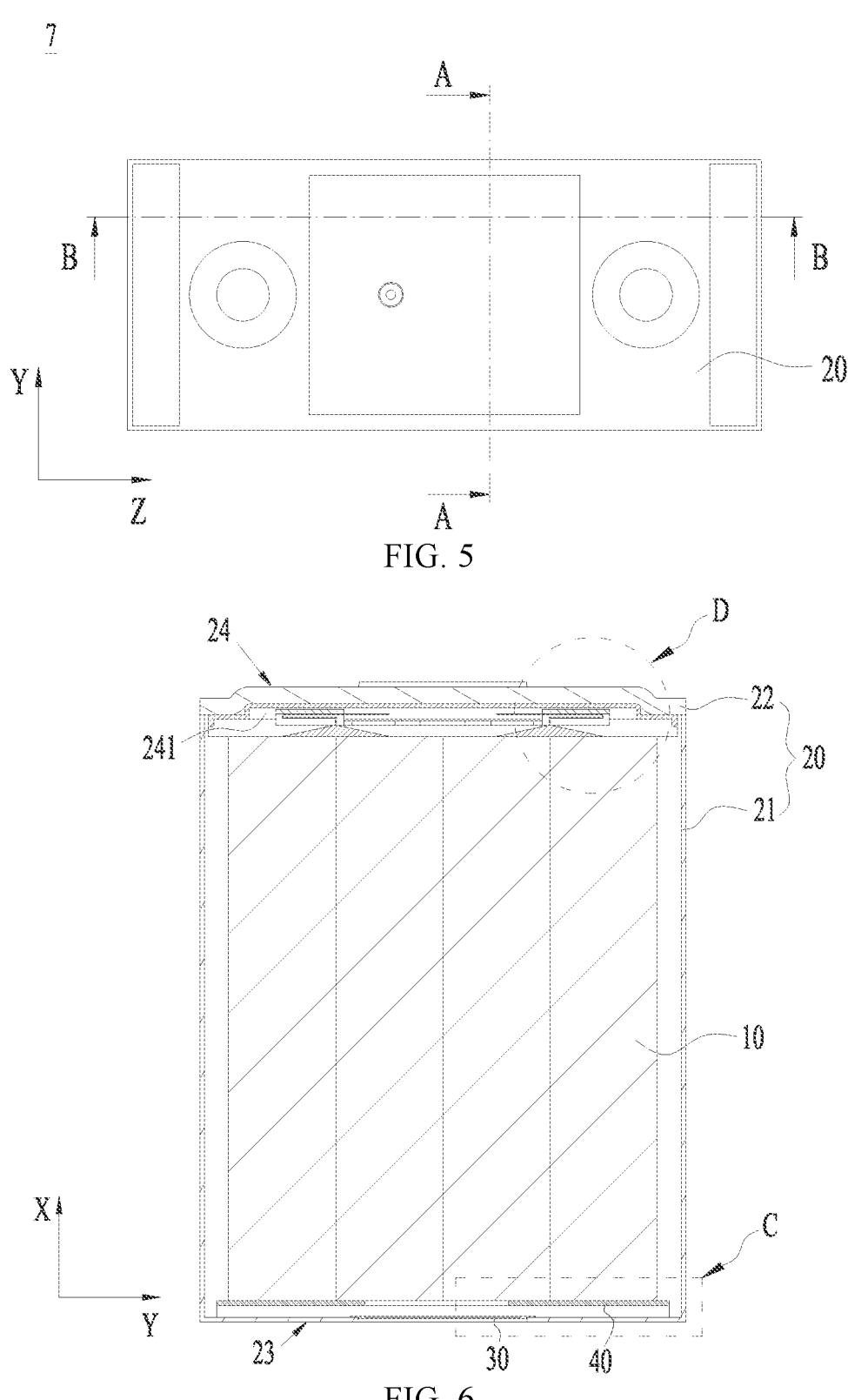
FIG. 5 is a schematic top view of a battery cell according to a specific embodiment of this application.
FIG. 6 is schematic sectional view of the battery cell shown in FIG. 5 and sectioned along an A-A line.
Figure 7:
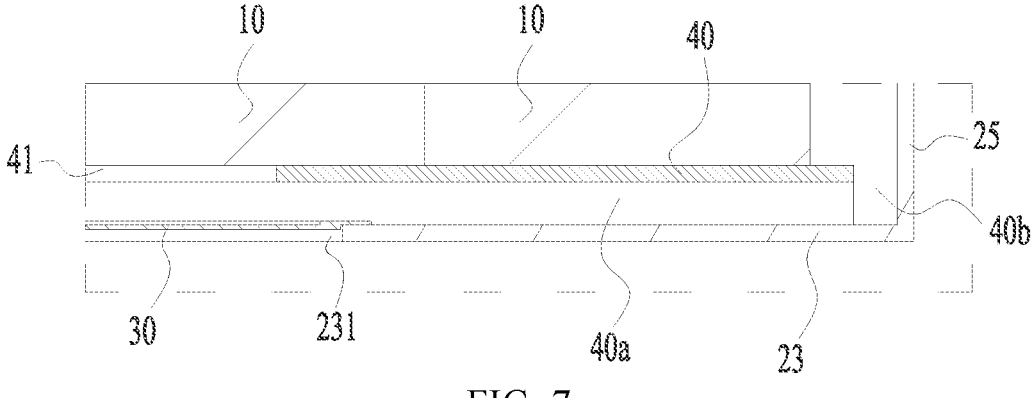
FIG. 7 is an enlarged schematic view of a boxed position C in the battery cell shown in FIG. 6.

FIG. 4 is a schematic exploded view of a battery cell according to some embodiments of this application; FIG. 5 is a schematic top view of a battery cell according to a specific embodiment of this application; FIG. 6 is schematic sectional view of the battery cell shown in FIG. 5 and sectioned along an A-A line; and FIG. 7 is an enlarged schematic view of a boxed position C in the battery cell shown in FIG. 6.

As shown in FIG. 4 to FIG. 7, the battery cell 7 according to this embodiment of this application includes an electrode assembly 10 and a shell assembly 20. The electrode assembly 10 is accommodated in the shell assembly 20.

In some embodiments, the shell assembly 20 may be further configured to accommodate an electrolyte such as an electrolytic solution. The shell assembly 20 may be one of various structures.

In some embodiments, the shell assembly 20 may include a housing 21 and a cover assembly 22. The housing 21 is a hollow structure opened on one side. The cover assembly 22 fits on, and is hermetically connected to, the opening of the housing 21, to form an accommodation cavity configured to accommodate the electrode assembly 10 and the electrolyte.

The housing 21 may be in various shapes such as a cylinder or a cuboid. The shape of the housing 21 may be determined depending on the specific shape of the electrode assembly 10. For example, if the electrode assembly 10 is a cylindrical structure, the housing may be a cylindrical housing. If the electrode assembly 10 is a cuboidal structure, the housing may be a cuboidal housing.

In some embodiments, the cover assembly 22 includes an end cap 221. The end cap 221 fits on the opening of the housing 21. The end cap 221 may be one of various structures. For example, the end cap 221 is a plate-like structure, a hollow structure opened at one end, or the like. For example, in FIG. 4, the housing 21 is a cuboidal structure, the end cap 221 is a plate-like structure, and the end cap 221 fits on the opening on top of the housing 21.

The end cap 221 may be made of an insulation material (such as plastic), or may be made of a conductive material (such as metal). When the end cap 221 is made of a metal material, the cap assembly 22 may further include an insulation piece 222. The insulation piece 222 is located on a side that is of the end cap 221 and that faces the electrode assembly 10, and is configured to dielectrically insulate the end cap 221 from the electrode assembly 10.

In some embodiments, the cover assembly 22 may further include electrode terminals 223. The electrode terminals 223 are mounted on the end cap 221. There are two electrode terminals 223. The two electrode terminals 223 are defined as a positive electrode terminal and a negative electrode terminal respectively. Both the positive electrode terminal and the negative electrode terminal are configured to electrically connect to the electrode assembly 10 to output electrical energy generated by the electrode assembly 10.

In other embodiments, the shell assembly 20 may be another structure. For example, the shell assembly 20 includes a housing 21 and two cap assemblies 22. The housing 21 is a hollow structure opened on two opposite sides. One cover assembly 22 fits on, and is hermetically connected to, one corresponding opening of the housing 21, to form an accommodation cavity configured to accommodate the electrode assembly 10 and the electrolyte. In such a structure, two electrode terminals 223 may be disposed on one cover assembly 22 and no electrode terminal 223 is disposed on the other cover assembly 22. Alternatively, the electrode terminal 223 is disposed on both cover assemblies 22 separately.

In the battery cell 7, one or more electrode assemblies 10 may be accommodated in the shell assembly 20. For example, in FIG. 4, there are four electrode assemblies 10.

In some embodiments, the battery cell 7 includes: an electrode assembly 10; a shell assembly 20, configured to accommodate the electrode assembly 10 and including a first side plate 23 and a second side plate 24, where the first side plate 23 and the second side plate 24 are located on two sides of the electrode assembly 10 along a first direction X respectively; a pressure relief mechanism 30, disposed on the first side plate 23; and a support member 40, disposed between the electrode assembly 10 and the first side plate 23, and configured to support the electrode assembly 10. A duct 40*a* is provided on the support member 40. The duct 40*a* is configured to guide gas between the second side plate 24 and the support member 40 into the pressure relief mechanism 30, so that the pressure relief mechanism 30 is actuated to release a pressure when the pressure reaches a threshold. A first recess 241 is formed on a side that is of the second side plate 24 and that faces the electrode assembly 10, and the first recess 241 is configured to accommodate at least a part of the electrode assembly 10.

The electrode assembly 10 includes a positive electrode plate, a negative electrode plate, and a separator. The electrode assembly 10 may be a jelly-roll electrode assembly, a stacked electrode assembly, or other forms of electrode assembly.

In some embodiments, the electrode assembly 10 is a jelly-roll electrode assembly. The positive electrode plate, the negative electrode plate, and the separator are all strip-like structures. In this embodiment of this application, the positive electrode plate, the separator, and the negative electrode plate may be sequentially stacked and wound for at least two coils to form the electrode assembly 10.

In other embodiments, the electrode assembly 10 is a stacked electrode assembly. Specifically, the electrode assembly 10 includes a plurality of positive electrode plates and a plurality of negative electrode plates. The positive electrode plates and the negative electrode plates are alternately stacked. The stacking direction is parallel to a thickness direction of the positive electrode plates and a thickness direction of the negative electrode plates.

As seen from the appearance of the electrode assembly 10, the electrode assembly 10 includes a body portion 11 and a tab portion 12 connected to the body portion 11. For example, the body portion 11 extends from an end of the body portion 11, the end being close to the cover assembly 22.

In some embodiments, there are two tab portions 12. The two tab portions 12 are defined as a positive tab portion and a negative tab portion respectively. The positive tab portion and the negative tab portion may extend from the same end of the body portion 11, or extend from two opposite ends of the body portion 11 respectively.

The body portion 11 is a core part of the electrode assembly 10, and is configured to implement the charging and discharging functions. The tab portion 12 is configured to lead out an electrical current generated by the body portion 11. The body portion 11 includes a positive current collecting portion of a positive current collector, a positive active material layer, a negative current collecting portion of a negative current collector, a negative active material layer, and a separator. The positive tab portion includes a plurality of positive tabs, and the negative tab portion includes a plurality of negative tabs.

The tab portion 12 is configured to electrically connect to the electrode terminal 223. The tab portion 12 may be directly connected to the electrode terminal 223 by welding or the like, or may be indirectly connected to the electrode terminal 223 by another component. For example, the electrode assembly 10 further includes current collecting members 13. Each of the current collecting members 13 is configured to electrically connect an electrode terminal 223 and a tab portion 12. There are two current collecting members 13. The two current collecting members 13 are defined as a positive current collecting member and a negative current collecting member respectively. The positive current collecting member is configured to electrically connect the positive electrode terminal and the positive tab portion. The negative current collecting member is configured to electrically connect the negative electrode terminal and the negative tab portion. When a plurality of electrode assemblies are disposed in the battery cell, the positive current collecting members of the plurality of electrode assemblies may be integrally disposed, and the negative current collecting members of the plurality of electrode assemblies may be integrally disposed.

The first side plate 23 and the second side plate 24 are two parts of the shell assembly 20, the two parts being disposed opposite to each other along the first direction X. The housing 21 of the shell assembly 20 is opened at an end along the first direction X.

When the housing 21 is a hollow structure opened at one end, the first side plate 23 may be the cover assembly 22, or may be a bottom plate of the housing 21, where the bottom plate is located on a side that is of the electrode assembly 10 and that faces back from the cover assembly 22. In other words, one of the first side plate 23 or the second side plate 24 is the cover assembly 22, and the other of the first side plate 23 or the second side plate 24 is the bottom plate of the housing 21.

When the housing 21 is a hollow structure opened at both ends, the first side plate 23 and the second side plate 24 are two cover assemblies 22 respectively.

A pressure relief mechanism 30 is disposed on the first side plate 23. The pressure relief mechanism 30 may be a part of the first side plate 23, or may be a discrete structure separated from the first side plate 23. A pressure relief hole 231 that runs through along a thickness direction of the pressure relief hole is disposed on the first side plate 23. The pressure relief mechanism 30 is fixed onto the first side plate 23 by welding or the like, and covers the pressure relief hole 231. The pressure relief mechanism 30 seals the pressure relief hole 231 to separate a space on the inner side from a space on the outer side of the first side plate 23, so as to prevent an electrolyte from flowing out through the pressure relief hole 231 during normal operation.

The pressure relief mechanism 30 is configured to be actuated to release an internal pressure when the internal pressure of the battery cell 7 reaches a threshold. When excessive gas is generated by the battery cell 7 and makes the internal pressure of the housing 21 rise and reach the threshold, the pressure relief mechanism 30 is actuated or a fragile structure in the pressure relief mechanism 30 is ruptured. The gas and other high-temperature and high-pressure substances are released outward through a yawning opening of the pressure relief mechanism 30 and the pressure relief hole 231, thereby preventing the battery cell 7 from exploding.

The pressure relief mechanism 30 may be any of various possible pressure relief structures, without being limited in this embodiment of this application. For example, the pressure relief mechanism 30 may be a pressure-sensitive pressure relief mechanism. The pressure-sensitive pressure relief mechanism is configured to rupture when the internal air pressure of the battery cell 7 equipped with the pressure-sensitive pressure relief mechanism reaches the threshold.

In some embodiments, nicks, grooves, or other structures are formed on the pressure relief mechanism 30 to reduce local strength of the pressure relief mechanism 30, and form a fragile structure on the pressure relief mechanism 30. When the internal pressure of the battery cell 7 reaches the threshold, the pressure relief mechanism 30 is ruptured at the fragile structure. A part of the pressure relief mechanism 30, which is disposed along the ruptured part, is folded to form an opening, so as to release the high-temperature and high-pressure substances.

The support member 40 is disposed between the electrode assembly 10 and the first side plate 23, and is configured to support the electrode assembly 10. The electrode assembly 10, the support member 40, and the first side plate 23 are arranged sequentially along the first direction X. For example, the support member 40 is made of an insulation material, and can dielectrically insulate the first side plate 23 from the electrode assembly 10. The support member 40 can support the electrode assembly 10, so as to alleviate shaking of the electrode assembly 10 during vibration of the battery cell 7, and reduce risks of detachment of an active material from the electrode assembly 10.

The support member 40 may directly abut against the electrode assembly 10 to support the electrode assembly 10, or may indirectly support the electrode assembly 10 through another member. For example, the battery cell 7 further includes an insulation spacer (not shown) coated on the body portion 11 of the electrode assembly 10. A part of the Insulation spacer is located between the support member 40 and the electrode assembly 10. The support member 40 supports the electrode assembly 10 through the insulation spacer.

The support member 40 may abut on the first side plate 23. For example, the support member 40 may abut on the first side plate 23 under the gravity of the electrode assembly 10. The support member 40 may be spaced apart from the first side plate 23 in the first direction X instead. For example, the housing 21 includes a bulge (not shown). The bulge may clasp the support member 40 from a side that is of the support member 40 and that faces back from the electrode assembly 10, so as to form a gap between the support member 40 and the first side plate 23.

In this embodiment of this application, a duct 40a of the support member 40 may be formed by removing a part of the support member 40. This application does not limit the shape of the duct 40a. For example, in this application, the duct 40a may be formed by making a recess and/or a hole or other structures on the support member 40. The duct 40a of the support member 40 is a space that is not filled with a solid, and is available for flow of a fluid (such as gas and liquid).

The space between the second side plate 24 and the support member 40 is in communication with the duct 40a. The fluid located between the second side plate 24 and the support member 40 can flow into the duct 40a. The duct 40a may be in direct communication with the space between the second side plate 24 and the support member 40, or may be in indirect communication with the space through a hole, gap, or other spatial structures.

The pressure relief mechanism 30 includes a pressure bearing surface oriented toward the support member 40. At least a part of the pressure bearing surface is exposed through the duct 40a. That is, at least a part of the pressure bearing surface is not in contact with the support member 40. The gas in the duct 40a can directly act on the pressure bearing surface. When a short circuit, overcharge, or another problem occurs, the electrode assembly 10 is thermally runaway and releases a large amount of high-temperature and high-pressure substances such as high-temperature and high-pressure gas. The duct 40a can guide the flow of the gas, so as to guide the gas between the second side plate 24 and the support member 40 into the pressure relief mechanism 30. The gas acts on the pressure bearing surface of the pressure relief mechanism 30, and exerts a pressure on the pressure relief mechanism 30. As the gas increases, the pressure borne by the pressure relief mechanism 30 rises. The pressure relief mechanism 30 is actuated when the pressure reaches a threshold, so as to release the gas and other high-temperature and high-pressure substances out of the battery cell 7. In this way, the internal pressure of the battery cell 7 is released to the outside to prevent explosion and fire of the battery cell 7.

For example, after the pressure relief mechanism 30 is actuated, the pressure relief hole 231 is opened, and the duct 40a communicates with the pressure relief hole 231. The gas as a filler between the second side plate 24 and the support member 40 is released outward through the duct 40a and the pressure relief hole 231.

This application does not limit the position of the duct 40a, as long as the duct 40a can guide the gas between the second side plate 24 and the support member 40 into the pressure relief mechanism 30. The duct 40a may be made between the support member 40 and the first side plate 23, or made on a side that is of the support member 40 and that faces back from the first side plate 23, or made at other positions.

The first recess 241 is made on the second side plate 24. If the second side plate 24 is a cover assembly 22, the first recess 241 is made on the cover assembly 22. If the second side plate 24 is a bottom plate of the housing 21, the second side plate 24 is made on the bottom plate of the housing 21.

When the end cap 221 of the cover assembly 22 is made of an insulation material, the first recess 241 may be made on a side that is of the end cap 221 and that faces the electrode assembly 10. When the end cap 221 of the cover assembly 22 is made of a conductive material and the cover assembly 22 includes the insulation piece 222, the first recess 241 may be made on a side that is of the insulation piece 222 and that faces the electrode assembly 10.

The first recess 241 is configured to accommodate at least a part of the electrode assembly 10, thereby vacating more space for the electrode assembly 10.

The tab portion 12 is led out from an end that is of the body portion 11 and that faces the second side plate 24. The first recess 241 is configured to accommodate at least a part of the tab portion 12 and/or at least a part of the current collecting member 13. It needs to be noted that, the first recess 241 being configured to accommodate at least a part of the tab portion 12 and/or at least a part of the current collecting member 13 means: at least a part of the tab portion 12 is accommodated in the first recess 241, or, at least a part of the current collecting member 13 is accommodated in the first recess 241, or, at least a part of the tab portion 12 and at least a part of the current collecting member 13 are accommodated in the first recess 241.

In this embodiment of this application, the capacity of the battery cell can be increased by increasing the volume of the electrode assembly. The larger the volume of the electrode assembly, the smaller the unfilled space in the accommodation cavity of the shell assembly. The unfilled space can serve as a duct for accommodating and exhausting the gas when the battery cell is thermally runaway. The gas exhausting rate will be reduced and safety hazards will occur if the unfilled space is deficient, especially if the unfilled space between the electrode assembly and the pressure relief mechanism is deficient. To ensure a relatively high energy density of the battery cell, the space reserved for the support member in the accommodation cavity of the shell assembly is limited, and the volume of the support member is also limited. Consequently, the duct made on the support member is undersized, and the gas exhausting rate of the duct is insufficient during thermal runaway of the battery cell, thereby causing safety hazards.

By disposing a duct 40a on the support member 40, this embodiment of this application can guide the gas into the pressure relief mechanism 30, where the gas is released by the battery cell 7 during thermal runaway. In this way, the pressure relief mechanism 30 is actuated in time to release the gas. The duct 40a can reduce a blocked area of the pressure relief mechanism 30 blocked by the support member 40, increase the pressure bearing area of the pressure relief mechanism 30, and make the pressure relief mechanism 30 be actuated in time to exhaust gas smoothly. On the premise that a volume of the electrode assembly 10 is constant, in this embodiment of this application, a first recess 241 is made on the second side plate 24 to accommodate at least a part of the electrode assembly 10, thereby increasing the spacing between the electrode assembly 10 and the first side plate 23 in the first direction X and vacating more space for the support member 40. Correspondingly, a duct 40a of a larger size can be made on the support member 40, so as to increase the gas exhausting rate during thermal runaway of the battery cell 7 on the basis of ensuring a relatively high capacity of the battery cell 7, and improve safety of the battery cell 7.

In some embodiments, the duct 40a is formed between the support member 40 and the first side plate 23.

The duct 40a is a gap formed between the support member 40 and the first side plate 23. The support member 40 and the first side plate 23 define the shape of the duct 40a. The duct 40a exposes at least a part of a surface that is of the first side plate 23 and that faces the support member 40. That is, at least a part of the surface that is of the first side plate 23 and that faces the support member 40 is not in contact with the support member 40.

The pressure relief mechanism 30 is mounted on the first side plate 23, so that the duct 40a is formed between the support member 40 and the first side plate 23. The duct can guide the gas into the pressure relief mechanism 30 smoothly, thereby facilitating actuation of the pressure relief mechanism 30 and release of the gas. The duct 40a is a gap formed between the support member 40 and the first side plate 23. The gap provides a mounting space for the pressure relief mechanism 30, thereby reducing risks of the support member 40 squeezing or blocking the pressure relief mechanism 30.

In this embodiment of this application, a first recess 241 is made on the second side plate 24 to accommodate at least a part of the electrode assembly 10, thereby increasing the spacing between the electrode assembly 10 and the first side plate 23 in the first direction X and vacating more space for the support member 40. The duct 40a is formed between the support member 40 and the first side plate 23. The dimension of the duct along the first direction X can be increased correspondingly, so as to increase the gas exhausting rate of the duct 40a during thermal runaway of the battery cell 7 and improve the safety of the battery cell 7.

In some embodiments, at least one through-hole 41 is made on the support member 40. The at least one through-hole 41 runs through the support member 40 along the first direction X to communicate with the duct 40a.

This application does not limit the number or position of the through-holes 41. There may be one or more through-holes 41. The through-hole 41 may be located in the middle of the support member 40, or may be located at the edge of the support member 40. In the first direction X, the through-hole 41 may overlap the pressure relief mechanism 30, or may be staggered from the pressure relief mechanism 30.

With the through-hole 41, the space between the second side plate 24 and the support member 40 can communicate with the duct 40a. When the battery cell 7 is thermally runaway, the electrode assembly 10 ejects gas toward the support member 40. A part of the gas can flow through the through-hole 41 into the duct 40a and act on the pressure relief mechanism 30, so as to be quickly released after the pressure relief mechanism 30 is actuated.

In the first direction X, a projection of at least one through-hole 41 at least partly overlaps a projection of the pressure relief mechanism 30. In this way, a part of the gas ejected from the electrode assembly 10 can impact the pressure relief mechanism 30 through the through-hole 41 to actuate the pressure relief mechanism 30 in time. Optionally, in the first direction X, the projection of one through-hole 41 covers the projection of the pressure relief mechanism 30.

In some embodiments, the shell assembly 20 further includes two third side plates 25 disposed opposite to each other along a second direction Y. The third side plates 25 are connected to the first side plate 23 and the second side plate 24, and the second direction Y is perpendicular to the first direction X. In the second direction Y, an exhaust gap 40b is provided between at least one of the third side plates 25 and the support member 40. The exhaust gap 40b communicates with the duct 40a and is configured to guide the gas between the second side plate 24 and the support member 40 into the duct 40a.

The two third side plates 25 may be two side plates of the housing 21, the two side plates being disposed opposite to each other along the second direction Y. A dimension of the support member 40 in the second direction Y is less than a dimension of the opening of the housing 21 in the second direction Y.

In this application, the exhaust gap 40b may be provided between one third side plate 25 and the support member 40, or the exhaust gap 40b may be provided between each of the two third side plates 25 and the support member 40.

With the exhaust gap 40b, the space between the second side plate 24 and the support member 40 can communicate with the duct 40a. When the battery cell 7 is thermally runaway, at least a part of the gas released by the electrode assembly 10 can act on the pressure relief mechanism 30 through the exhaust gap 40b and the duct 40a, so as to be released in time after the pressure relief mechanism 30 is actuated.

In some embodiments, the shell assembly 20 may further include two fourth side plates 26 disposed opposite to each other along a third direction Z. The fourth side plates 26 are connected to the first side plate 23 and the second side plate 24, and the third direction Z is perpendicular to the first direction X.

The two fourth side plates 26 may be two side plates of the housing 21, the two side plates being disposed opposite to each other along the third direction Z. The third direction Z intersects the second direction Y, and optionally, the third direction Z is perpendicular to the second direction Y.

In some embodiments, in the second direction Y, an exhaust gap is also provided between at least one of the fourth side plates 26 and the support member 40. The exhaust gap communicates with the duct 40a and is configured to guide the gas between the second side plate 24 and the support member 40 into the duct 40a.

In some embodiments, the support member is spaced apart from the first side plate in the first direction to form the duct between the support member and the first side plate. A gap is formed between the surface of the support member and the first side plate, the surface facing the first side plate. In this way, the gas exhausting space between the support member and the first side plate is increased, and the gas exhausting rate of the battery cell during thermal runaway is increased.

In other embodiments, the support member 40 may abut on the first side plate 23.

Figure 8:
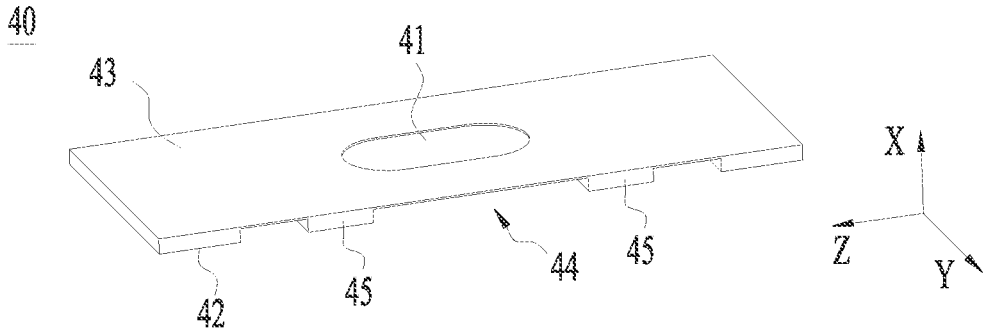
FIG. 8 is a schematic structural diagram of a support member of a battery cell according to some embodiments of this application.
Figure 9:
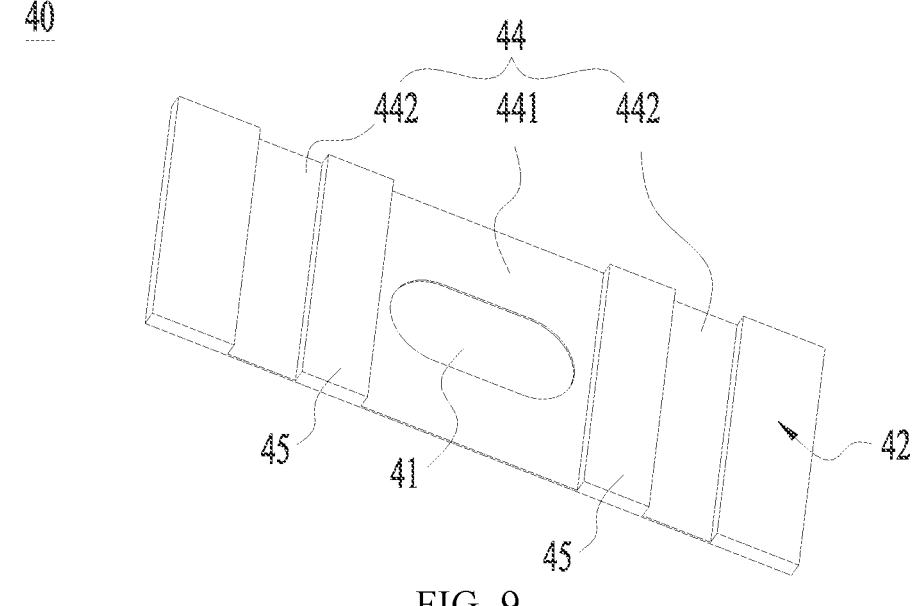
FIG. 9 is a schematic structural diagram of the support member shown in FIG. 8 and viewed from another angle.

FIG. 8 is a schematic structural diagram of a support member of a battery cell according to some embodiments of this application; FIG. 9 is a schematic structural diagram of the support member shown in FIG. 8 and viewed from another angle; and FIG. 10 is a schematic sectional view of the support member shown in FIG. 8.

Referring to FIG. 7 to FIG. 10, in some embodiments, the support member 40 includes a first surface 42 and a second surface 43 disposed opposite to each other. The first surface 42 faces the first side plate 23 and abuts against the first side plate 23, and the second surface 43 faces the electrode assembly 10. The support member 40 includes a second recess 44. The second recess 44 sinks against the first surface 42 along a direction back from the first side plate 23. At least a part of the second recess 44 overlaps the pressure relief mechanism 30 in the first direction X. The second recess 44 forms at least a part of the duct 40*a*.

A bottom wall of the second recess 44 is spaced apart from the pressure relief mechanism 30 in the first direction X. The projection of the bottom wall of the second recess 44 in the first direction X at least partly overlaps the projection of the pressure relief mechanism 30 in the first direction X. Optionally, the projection of the bottom wall of the second recess 44 in the first direction X covers the projection of the pressure relief mechanism 30 in the first direction X. The second recess 44 may form the entirety of the duct 40*a*, or just a part of the duct 40*a*.

The first surface 42 and the second surface 43 may be flat faces. Optionally, the first surface 42 is parallel to the second surface 43.

At least one through-hole 41 extends from the second surface 43 to the bottom wall of the second recess 44 to communicate with the second recess 44.

In a second direction Y perpendicular to the first direction X, both ends of the second recess 44 may be closed; or, one end is closed but the other end is open (that is, the other end of the second recess 44 extends to an end face of the support member 40 along the second direction Y); or, both ends are open (the second recess 44 runs through the support member 40 along the second direction Y).

In this embodiment of this application, a first recess is made on the second side plate to accommodate at least a part of the electrode assembly 10, thereby increasing the spacing between the electrode assembly 10 and the first side plate 23 in the first direction X and vacating more space for the support member 40. The depth of the second recess 44 along the first direction X can also be increased correspondingly, so as to increase the gas exhausting rate during thermal runaway of the battery cell on the basis of ensuring a relatively high capacity of the battery cell, and improve safety of the battery cell. The application does not limit the depth of the second recess 44 in the first direction X. The depth of the second recess 44 may be determined depending on the depth of the first recess in the first direction X, the gas exhausting rate required by the battery cell, the dimensions of the electrode assembly 10, and the like. The depth of the second recess 44 in the first direction X may be greater than the depth of the first recess in the first direction X, or less than or equal to the depth of the first recess in the first direction X.

In this embodiment of this application, the second recess 44 can guide the gas into the pressure relief mechanism 30, thereby facilitating actuation of the pressure relief mechanism 30 and release of the gas. The second recess 44 provides a mounting space for the pressure relief mechanism 30, thereby reducing risks of the support member 40 squeezing or blocking the pressure relief mechanism 30. By making the second recess 44, the weight of the support member 40 can be reduced, and the energy density of the battery cell can be increased.

In some embodiments, the second recess 44 runs through the support member 40 along a second direction Y, and the second direction Y is perpendicular to the first direction X.

The first direction X is parallel to the thickness direction of the support member 40. The second direction Y may be parallel to the length direction of the support member 40 or may be parallel to the width direction of the support member 40.

The second recess 44 runs through the support member 40 along the second direction Y. Therefore, the space on both sides of the support member 40 along the second direction Y can communicate with the second recess 44, so that the gas inside the battery cell can flow into the second recess 44 more easily.

In some embodiments, the second recess 44 communicates with the exhaust gas 40*b* between the support member 40 and the third side plate 25.

In some embodiments, in the first direction X, the depth of the second recess 44 is less than or equal to the depth of the first recess.

In this embodiment of this application, the second recess 44 is enlarged by the space vacated by the first recess. The depth of the second recess 44 is less than or equal to the depth of the first recess, thereby ensuring a relatively high capacity of the battery cell.

Optionally, on the premise of meeting the gas exhausting requirements, the depth of the second recess 44 in the first direction X is less than the depth of the first recess in the first direction X. The second recess 44 utilizes just a part of the space vacated by the first recess in the first direction X. In this embodiment of this application, the volume of the electrode assembly 10 can be increased, so as to utilize the remaining space vacated by the first recess in the first direction X, and in turn, increase the capacity of the battery cell.

In some embodiments, a ratio of the depth of the second recess 44 in the first direction X to the dimension of the support member 40 in the first direction X is greater than 0.5. This application can increase the gas exhausting rate by increasing the depth of the second recess 44, and further, can decrease the thickness of the support member 40 at a local position by increasing the depth of the second recess 44. When the electrode assembly 10 releases high-temperature and high-pressure substances, the high-temperature and high-pressure substances can melt through a part of the support member 40, the part at which the second recess 44 is disposed. In this way, the gas can more easily flow into the second recess 44, and the gas exhausting rate is increased.

In some embodiments, at least one support portion 45 is disposed on a bottom wall of the second recess 44. The support portion 45 is configured to abut against the first side plate 23. The second recess 44 includes a first part 441 and a second part 442. The first part 441 and the second part 442 are located on two sides of the support portion 45 respectively. The first part 441 covers the pressure relief mechanism 30 in the first direction X. The second part 442 is staggered from the pressure relief mechanism 30 in the first direction X.

The support portion 45 abuts on the first side plate 23. The dimension of the support portion 45 in the first direction X may be equal to the depth of the second recess 44 along the first direction X.

There may be one or more support portions 45. When there are a plurality of support portions 45, the plurality of support portions 45 are spaced out. For example, the plurality of support portions 45 may be spaced out along the second direction Y. The support portion 45 divides the second recess 44 into a plurality of parts.

That the first part 441 covers the pressure relief mechanism 30 in the first direction X means: the projection of the first part 441 in the first direction X covers the projection of the pressure relief mechanism 30 in the first direction X. That the second part 442 is staggered from the pressure relief mechanism 30 in the first direction X means: the projection of the second part 442 in the first direction X does not overlap the projection of the pressure relief mechanism 30 in the first direction X.

The first part 441 and the second part 442 may communicate with each other through other structures, or may be partitioned off from each other.

The through-hole 41 extends from the second surface 43 to the bottom wall of the first part 441 to communicate with the first part 441. In the second direction Y, both the first part 441 and the second part 442 run through the support member 40.

The larger the volume of the second recess 44, the higher the gas exhausting rate. However, the support member 40 needs to support the electrode assembly 10. The larger the volume of the second recess 44, the lower the strength of a part that is of the support member 40 and that corresponds to the second recess 44, and the more prone the support member 40 are to deform and collapse locally to bring risks of shaking the electrode assembly 10. The support portion 45 disposed according to this embodiment of this application can increase the overall strength of the support member 40, reduce risks of deformation and collapse of the support member 40, and improve stability.

FIG. 11 is a schematic structural diagram of a support member of a battery cell according to other embodiments of this application.

As shown in FIG. 11, in some embodiments, the support portion 45 includes a communication structure 451. The communication structure 451 is configured to implement mechanical communication between the first part 441 and the second part 442. The communication structure 451 forms a part of the duct 40*a*.

The communication structure 451 disposed according to this application enables flow of gas between the first part 441 and the second part 442, thereby increasing gas exhausting paths, and increasing the gas exhausting rate during thermal runaway of the battery cell.

FIG. 12 is a schematic structural diagram of a support member of a battery cell according to still other embodiments of this application.

As shown in FIG. 12, in some embodiments, the support member 40 further includes a third recess 46. The third recess 46 sinks against the second surface 43 along a direction back from the electrode assembly. The third recess 46 is configured to guide the gas in the electrode assembly into a space between the second side plate and the support member.

The third recess 46 communicates with the second recess 44. For example, the third recess 46 may communicate with the second recess 44 through an exhaust gap between the support member 40 and the third side plate.

In the second direction Y, both ends of the third recess 46 may be closed; or, one end is closed but the other end is open (that is, the other end of the third recess 46 extends to an end face of the support member 40 along the second direction Y); or, both ends are open (the third recess 46 runs through the support member 40 along the second direction Y).

During thermal runaway of the battery cell, high-temperature and high-pressure substances such as gas are ejected from both ends of the electrode assembly along the first direction X. The third recess 46 can guide the gas, which is ejected from the electrode assembly, into the space between the second side plate and the support member 40, so that the blocking of gas by the support member 40 is alleviated, and the gas exhausting rate is increased.

In some embodiments, in the first direction X, the third recess 46 is staggered from the second recess 44. In other words, in the first direction X, the projection of the third recess 46 does not overlap the projection of the second recess 44. In this way, the second recess 44 and the third recess 46 can be prevented from running through the support member 40 on the basis of ensuring appropriate depths of the second recess 44 and the third recess 46.

In some embodiments, the third recess 46 runs through the support member 40 along a second direction Y, and the second direction Y is perpendicular to the first direction X. The third recess 46 runs through the support member 40 along the second direction Y. Therefore, the space on both sides of the support member 40 along the second direction Y can communicate with the third recess 46, and the gas released by the electrode assembly can more easily flow through the third recess 46 into the spaces located on two sides of the support member 40 along the second direction Y.

Figures 13, 14:
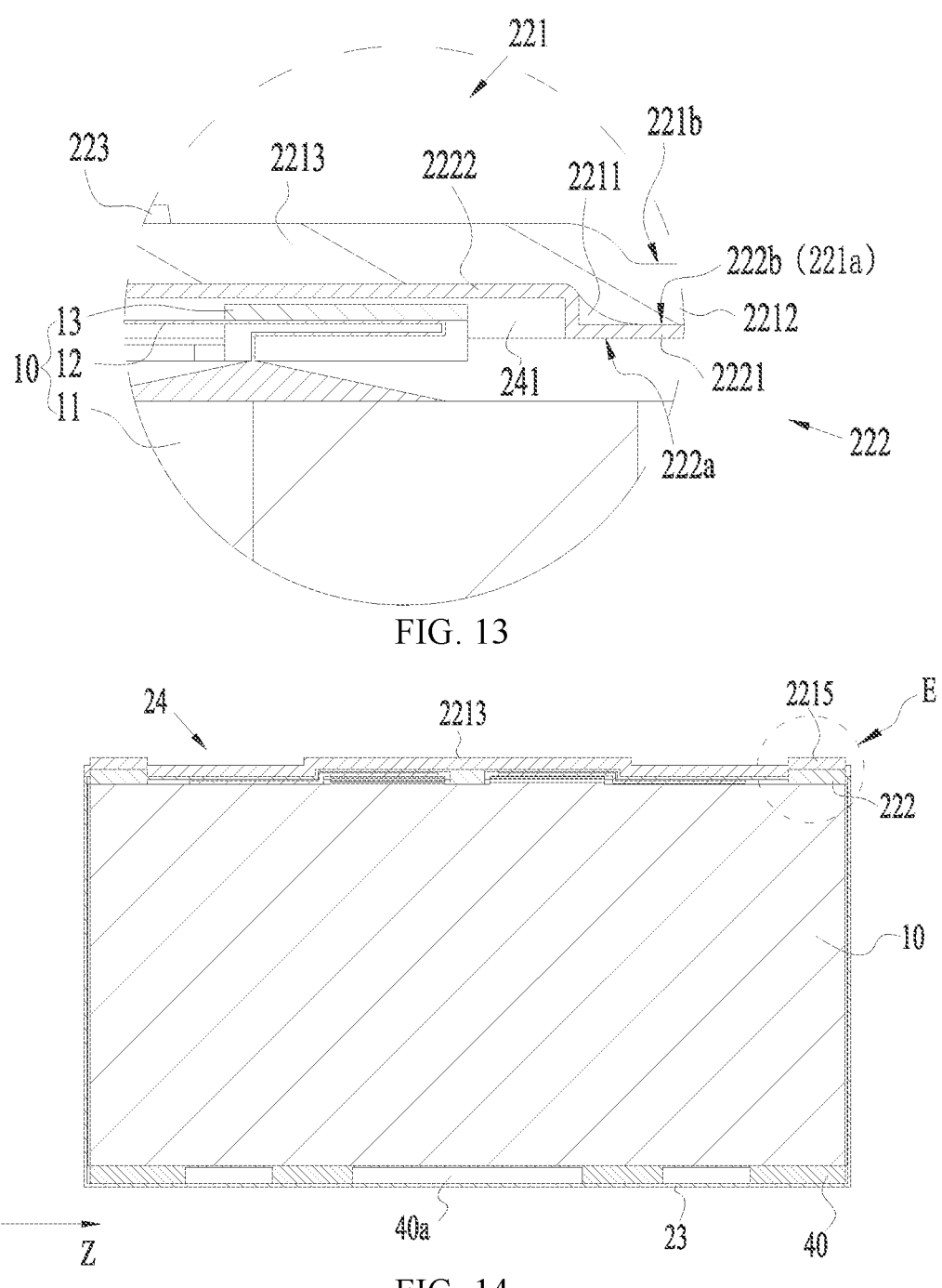
FIG. 13 is an enlarged schematic view of a circled position D in the battery cell shown in FIG. 6.
FIG. 14 is schematic sectional view of the battery cell shown in FIG. 5 and sectioned along a B-B line.

FIG. 13 is an enlarged schematic view of a circled position D in the battery cell shown in FIG. 6; FIG. 14 is schematic sectional view of the battery cell shown in FIG. 5 and sectioned along a B-B line; and FIG. 15 is an enlarged schematic view of a circled position E in the battery cell shown in FIG. 14.

Figure 15:
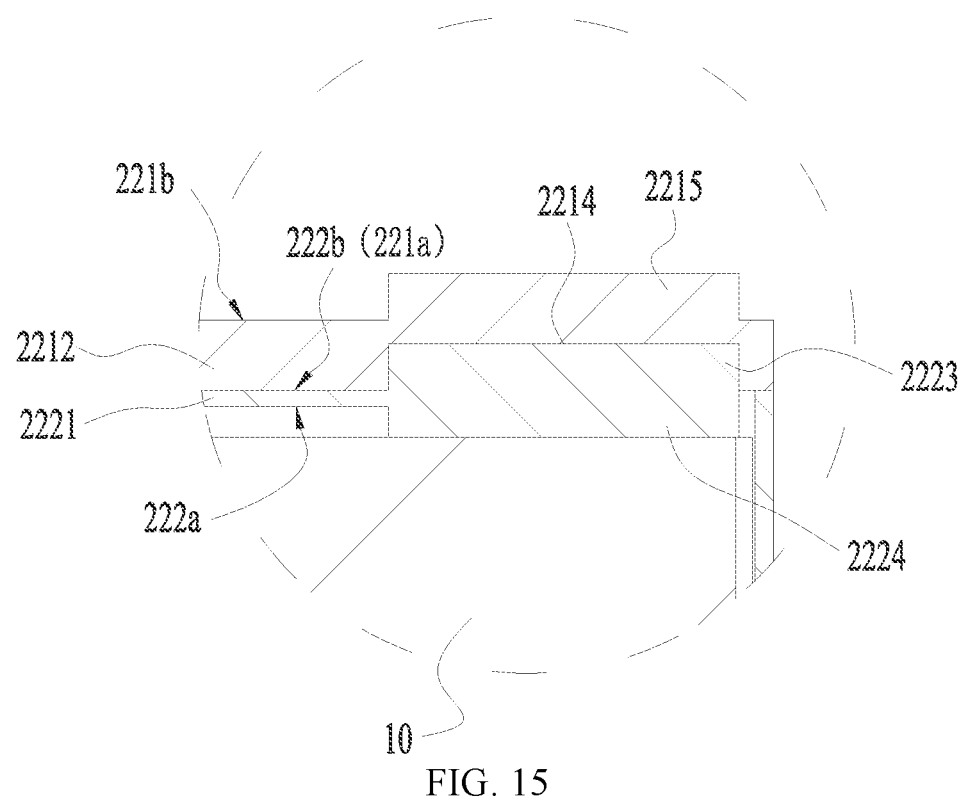
FIG. 15 is an enlarged schematic view of a circled position E in the battery cell shown in FIG. 14.

As shown in FIG. 13 to FIG. 15, in some embodiments, the second side plate 24 includes an end cap 221 and an insulation piece 222. The insulation piece 222 is located on a side that is of the end cap 221 and that faces the electrode assembly 10, and the insulation piece 222 forms the first recess 241 on the side that faces the electrode assembly 10.

The second side plate 24 is a cover assembly 22 of the shell assembly 20. The insulation piece 222 can dielectrically insulate the end cap 221 from the electrode assembly 10 to reduce short-circuit risks.

In some embodiments, the insulation piece 222 includes a first body 2221 and a first bulge 2222. The first body 2221 includes a first inner surface 222*a* and a first outer surface 222*b* opposite to each other. The first inner surface 222*a* faces the electrode assembly 10. The first bulge 2222 is disposed protrusively on the first outer surface 222*b*. The first recess 241 is formed on a side that is of the first bulge 2222 and that faces the electrode assembly 10, and sinks against the first inner surface 222*a*. A fourth recess 2211 is formed on a side that is of the end cap 221 and that faces the electrode assembly 10. The fourth recess 2211 is configured to accommodate the first bulge 2222.

On the one hand, the first bulge 2222 can exert a reinforcing effect on the position at which the first recess 241 is disposed. On the other hand, the first bulge 2222 disposed can cause the first recess 241 to sink as far as possible along a direction back from the electrode assembly 10, so as to increase the depth of the first recess 241 and provide more space for the duct 40*a*.

The first bulge 2222 is accommodated in the fourth recess 2211, so as to reduce the internal space of the housing 21 occupied by the insulation piece 222, and further vacate more space for the electrode assembly 10 and the support member 40, and in turn, increase the gas exhausting rate on the basis of ensuring a relatively high capacity of the battery cell 7.

In some embodiments, the end cap 221 includes a second body 2212 and a second bulge 2213. The second body 2212 includes a second inner surface 221*a* and a second outer surface 221*b* opposite to each other. The second inner surface 221*a* faces the first body 2221 and fits snugly with the first outer surface 222*b*. The second bulge 2213 is disposed protrusively on the second outer surface 221*b*. The fourth recess 2211 is formed on a side that is of the second bulge 2213 and that faces the electrode assembly 10, and sinks against the second inner surface 221*a*.

The second bulge 2213 exerts a reinforcing effect on a position at which the fourth recess 2211 is disposed on the end cap 221. In addition, the fourth recess 2211 can sink as far as possible along the direction back from the electrode assembly 10, so as to accommodate the first recess 2222.

In some embodiments, the second side plate 24 further includes an electrode terminal 223 mounted on the end cap 221. The electrode terminal 223 is configured to electrically connect to the electrode assembly 10. Along a protrusion direction of the second bulge 2213, the second bulge 2213 does not protrude beyond the electrode terminal 223.

In the first direction X, the end face that is of the second bulge 2213 and away from the electrode assembly 10 is not higher than the end face that is of the electrode terminal 223 and away from the electrode assembly 10.

In this embodiment of this application, along a protrusion direction of the second bulge 2213, the second bulge 2213 does not protrude beyond the electrode terminal 223. Therefore, even if the second bulge 2213 is disposed on the end cap 221, a maximum dimension of the battery cell 7 in the first direction X will not be increased, thereby ensuring a relatively high energy density of the battery cell 7.

In some embodiments, the insulation piece 222 further includes a third bulge 2223. The third bulge 2223 and the first bulge 2222 are located on two sides of the electrode terminal 223 respectively. The third bulge 2223 is disposed protrusively on the first outer surface 222*b*. The end cap 221 further includes a fifth recess 2214. The fifth recess 2214 sinks against the second inner surface 221*a*. The fifth recess 2214 is configured to accommodate the third bulge 2223.

The third bulge 2223 disposed can increase the overall strength of the insulation piece 222, and reduce the deformation of the insulation piece 222 during the assembling. The third bulge 2223 and the fifth recess 2214 can serve a positioning function during the assembling of the insulation piece 222 and the end cap 221. The third bulge 2223 may be in interference fit with the fifth recess 2214, so as to implement fixing between the insulation piece 222 and the end cap 221.

In some embodiments, the end cap 221 further includes a fourth bulge 2215. The fourth bulge 2215 is disposed protrusively on the second outer surface 221*b*. The fifth recess 2214 is formed on a side that is of the fourth bulge 2215 and that faces the electrode assembly 10, and sinks against the second inner surface 221*a*.

In some embodiments, along a protrusion direction of the fourth bulge 2215, the fourth bulge 2215 does not protrude beyond the electrode terminal 223.

In some embodiments, the insulation piece 222 further includes a fifth bulge 2224. The fifth bulge 2224 is disposed protrusively on the first inner surface 222*a*. The fifth bulge 2224 is configured to abut against the body portion 11 of the electrode assembly 10 to alleviate shaking of the electrode assembly 10.

Figure 16:
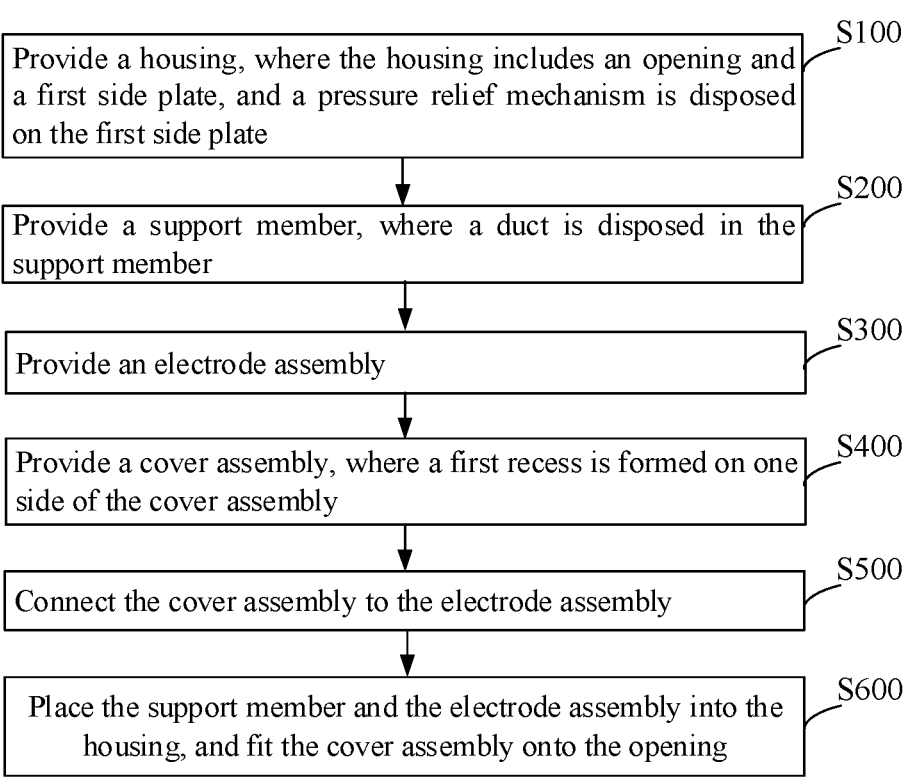
FIG. 16 is a schematic flowchart of a method for manufacturing a battery cell according to some embodiments of this application.

FIG. 16 is a schematic flowchart of a method for manufacturing a battery cell according to some embodiments of this application.

As shown in FIG. 16, the method for manufacturing a battery cell according to an embodiment of this application includes the following steps:

S100: Provide a housing, where the housing includes an opening and a first side plate, and a pressure relief mechanism is disposed on the first side plate;

S200: Provide a support member, where a duct is disposed in the support member;

S300: Provide an electrode assembly;

S400: Provide a cover assembly, where a first recess is formed on one side of the cover assembly;

S500: Connect the cover assembly to the electrode assembly; and

S600: Place the support member and the electrode assembly into the housing, and fit the cover assembly onto the opening.

The first side plate and the cover assembly are located on two sides of the electrode assembly along a first direction respectively. The support member is disposed between the electrode assembly and the first side plate, and configured to support the electrode assembly. The duct is configured to guide gas between the cover assembly and the support member into the pressure relief mechanism, so that the pressure relief mechanism is actuated to release a pressure when the pressure reaches a threshold. The first recess is formed on a side that is of the cover assembly and that faces the electrode assembly. The first recess accommodates at least a part of the electrode assembly.

In step S600, the support member may be placed into the housing first, and then the electrode assembly is placed into the housing; or, the support member may be fixed onto the electrode assembly first, and then the support member and the electrode assembly may be placed into the housing together.

It needs to be noted that, for the related structures of the battery cells manufactured according to the foregoing method for manufacturing a battery cell, refer to the descriptions of the battery cells provided in the foregoing embodiments.

In assembling a battery cell based on the foregoing method for manufacturing a battery cell, it is not necessary to perform the foregoing steps in sequence. That is, the steps may be performed in the order mentioned in the embodiments, or the steps may be performed in order different from what is mentioned in the embodiments, or several steps are performed concurrently. For example, steps S100, S200, S300, and S400 may be performed concurrently rather than sequentially.

Figure 17:
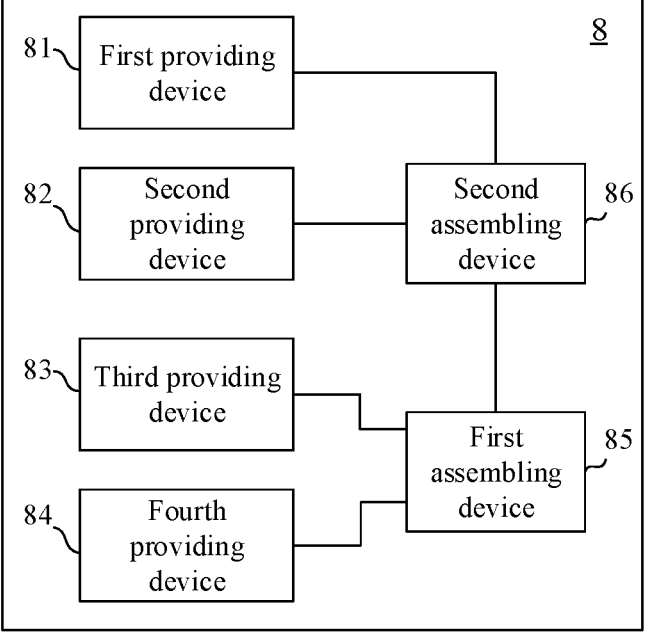
FIG. 17 is a schematic block diagram of a system for manufacturing a battery cell according to some embodiments of this application.

FIG. 17 is a schematic block diagram of a system for manufacturing a battery cell according to some embodiments of this application.

As shown in FIG. 17, a system 8 for manufacturing a battery cell according to an embodiment of this application includes: a first providing device 81, configured to provide a housing, where the housing includes an opening and a first side plate, and a pressure relief mechanism is disposed on the first side plate; a second providing device 82, configured to provide a support member, where a duct is disposed in the support member; a third providing device 83, configured to provide an electrode assembly; a fourth providing device 84, configured to provide a cover assembly, where a first recess is formed on one side of the cover assembly; a first assembling device 85, configured to connect the cover assembly to the electrode assembly; and a second assembling device 86, configured to place the support member and the electrode assembly into the housing, and fit the cover assembly onto the opening. The first side plate and the cover assembly are located on two sides of the electrode assembly along a first direction respectively. The support member is disposed between the electrode assembly and the first side plate, and configured to support the electrode assembly. The duct is configured to guide gas between the cover assembly and the support member into the pressure relief mechanism, so that the pressure relief mechanism is actuated to release a pressure when the pressure reaches a threshold. The first recess is formed on a side that is of the cover assembly and that faces the electrode assembly. The first recess accommodates at least a part of the electrode assembly.

For the related structures of the battery cells manufactured by the foregoing manufacturing system, refer to the descriptions of the battery cells provided in the foregoing embodiments.

It needs to be noted that to the extent that no conflict occurs, the embodiments of this application and the features in the embodiments may be combined with each other.

Finally, it needs to be noted that the foregoing embodiments are merely intended to describe the technical solutions of this application, but not to limit this application. Although this application is described in detail with reference to the foregoing embodiments, a person of ordinary skill in the art understands that modifications may still be made to the technical solutions described in the foregoing embodiments or equivalent replacements may still be made to some technical features thereof, without making the essence of the corresponding technical solutions depart from the spirit and scope of the technical solutions of the embodiments of this application.

What is claimed is:

1. A battery cell, comprising:
an electrode assembly;
a shell assembly, configured to accommodate the electrode assembly and comprising a first side plate and a second side plate, wherein the first side plate and the second side plate are located on two sides of the electrode assembly along a first direction respectively;
a pressure relief mechanism, disposed on the first side plate; and
a support member, disposed between the electrode assembly and the first side plate, and configured to support the electrode assembly,
wherein the support member has a first surface facing the first side plate, and a second surface facing the electrode assembly, at least one support portion protrudes from the first surface, so that a duct is formed between the support member and the first side plate, and the duct is configured to guide gas between the second side plate and the support member into the pressure relief mechanism, so that the pressure relief mechanism is actuated to release a pressure when the pressure reaches a threshold;
wherein the second side plate comprises an end cap and an insulation piece, the insulation piece is located on a side of the end cap that faces the electrode assembly, the end cap and the insulation piece fit snugly to form a first recess away from the electrode assembly, and the first recess is configured to accommodate at least a part of the electrode assembly;
wherein the insulation piece comprises a first body and a first bulge, the first body comprises a first inner surface and a first outer surface opposite to each other, the first inner surface faces the electrode assembly, the first bulge is disposed protrusively on the first outer surface, and the first recess is formed on a side of the first bulge that faces the electrode assembly, and sinks against the first inner surface; and
wherein a fourth recess is formed on a side of the end cap that faces the electrode assembly, and the fourth recess is configured to accommodate the first bulge.

2. The battery cell according to claim 1,
wherein the support member further comprises a second recess, and the second recess sinks against the first surface along a direction back from the first side plate;
at least a part of the second recess overlaps the pressure relief mechanism in the first direction; and
the second recess forms at least a part of the duct.

3. The battery cell according to claim 2, wherein the second recess runs through the support member along a second direction, and the second direction is perpendicular to the first direction.

4. The battery cell according to claim 2, wherein, in the first direction, a depth of the second recess is less than or equal to a depth of the first recess.

5. The battery cell according to claim 2, wherein
the second recess comprises a first part and a second part, the first part and the second part are located on two sides of the at least one support portion respectively, the first part covers the pressure relief mechanism in the first direction, and the second part is staggered from the pressure relief mechanism in the first direction.

6. The battery cell according to claim 5, wherein the at least one support portion comprises a communication structure, the communication structure is configured to implement mechanical communication between the first part and the second part, and the communication structure forms a part of the duct.

7. The battery cell according to claim 2, wherein the support member further comprises a third recess, the third recess sinks against the second surface along a direction back from the electrode assembly, and the third recess is configured to guide the gas in the electrode assembly into a space between the second side plate and the support member.

8. The battery cell according to claim 7, wherein the third recess runs through the support member along a second direction, and the second direction is perpendicular to the first direction.

9. The battery cell according to claim 1, wherein at least one through-hole is made on the support member, and the at least one through-hole runs through the support member along the first direction to communicate with the duct.

10. The battery cell according to claim 1, wherein
the shell assembly further comprises two third side plates disposed opposite to each other along a second direction, the third side plates are connected to the first side plate and the second side plate, and the second direction is perpendicular to the first direction; and
in the second direction, an exhaust gap is provided between at least one of the third side plates and the support member, and the exhaust gap communicates with the duct and is configured to guide the gas between the second side plate and the support member into the duct.

11. The battery cell according to claim 1, wherein the end cap comprises a second body and a second bulge, the second body comprises a second inner surface and a second outer surface opposite to each other, the second inner surface faces the first body and fits snugly with the first outer surface, the second bulge is disposed protrusively on the second outer surface, and the fourth recess is formed on a side of the second bulge that faces the electrode assembly, and sinks against the second inner surface.

12. The battery cell according to claim 11, wherein the second side plate further comprises an electrode terminal mounted on the end cap, and the electrode terminal is configured to electrically connect to the electrode assembly; and along a protrusion direction of the second bulge, the second bulge does not protrude beyond the electrode terminal.

13. The battery cell according to claim 12, wherein the insulation piece further comprises a third bulge, the third bulge and the first bulge are located on two sides of the electrode terminal respectively, and the third bulge is disposed protrusively on the first outer surface; and the end cap further comprises a fifth recess, the fifth recess sinks against the second inner surface, and the fifth recess is configured to accommodate the third bulge.

14. A battery, comprising the battery cell according to claim 1.

15. An electrical device, comprising the battery according to claim 14.

16. A method for manufacturing a battery cell, comprising:

providing a housing, wherein the housing comprises an opening and a first side plate, and a pressure relief mechanism is disposed on the first side plate;

providing a support member, wherein a duct is disposed in the support member;

providing an electrode assembly;

providing a cover assembly, wherein the cover assembly comprises an end cap and an insulation piece, the insulation piece is located on a side of the end cap that faces the electrode assembly, the end cap and the insulation piece fit snugly to form a first recess away from the cover assembly, and the first recess accommodates at least a part of the electrode assembly:

connecting the cover assembly to the electrode assembly; and placing the support member and the electrode assembly into the housing, and fitting the cover assembly onto the opening, wherein, the first side plate and the cover assembly are located on two sides of the electrode assembly along a first direction respectively;

the support member is disposed between the electrode assembly and the first side plate, and configured to support the electrode assembly, the support member has a first surface facing the first side plate, and a second surface facing the electrode assembly, at least one support portion protrudes from the first surface, so that the duct is formed between the support member and the first side plate, the duct is configured to guide gas between the cover assembly and the support member into the pressure relief mechanism, so that the pressure relief mechanism is actuated to release a pressure when the pressure reaches a threshold; and wherein the insulation piece comprises a first body and a first bulge, the first body comprises a first inner surface and a first outer surface opposite to each other, the first inner surface faces the electrode assembly, the first bulge is disposed protrusively on the first outer surface, and the first recess is formed on a side of the first bulge that faces the electrode assembly, and sinks against the first inner surface; and a fourth recess is formed on a side of the end cap that faces the electrode assembly, and the fourth recess is configured to accommodate the first bulge.

* * * * *